(12) United States Patent
Baghel et al.

(10) Patent No.: US 10,360,797 B2
(45) Date of Patent: Jul. 23, 2019

(54) REQUEST-RESPONSE-BASED SHARING OF SENSOR INFORMATION

(71) Applicant: QUALCOMM Incorporated, San Diego, CA (US)

(72) Inventors: Sudhir Kumar Baghel, Hillsborough, NJ (US); Shailesh Patil, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/695,954

(22) Filed: Sep. 5, 2017

(65) Prior Publication Data

US 2018/0218607 A1    Aug. 2, 2018

Related U.S. Application Data

(60) Provisional application No. 62/451,393, filed on Jan. 27, 2017.

(51) Int. Cl.
    *G08G 1/16*            (2006.01)
    *H04W 88/04*       (2009.01)
    (Continued)

(52) U.S. Cl.
    CPC ........... *G08G 1/162* (2013.01); *G08G 1/0112* (2013.01); *G08G 1/096791* (2013.01); *G08G 1/161* (2013.01); *G08G 1/166* (2013.01); *H04W 4/38* (2018.02); *H04W 4/44* (2018.02); *H04W 88/04* (2013.01); *G08G 1/123* (2013.01); *H04L 67/12* (2013.01); *H04W 4/14* (2013.01); *H04W 8/24* (2013.01)

(58) Field of Classification Search
CPC ........... G08G 1/0112; G08G 1/096791; G08G 1/161; G08G 1/162; G08G 1/166; G08G 1/123; H04L 67/12; H04W 4/06; H04W 4/14; H04W 8/24
See application file for complete search history.

(56) References Cited

U.S. PATENT DOCUMENTS 9,261,882 B2 *   2/2016   Kim ..................... G05D 1/0287
2009/0326791 A1 *   12/2009   Horvitz .............. G01C 21/3461
                                                                                                                                           701/119
(Continued)

FOREIGN PATENT DOCUMENTS

EP                2310802 A2     4/2011

OTHER PUBLICATIONS

International Search Report and Written Opinion—PCT/US2017/068739—ISA/EPO—dated Apr. 5, 2018.

*Primary Examiner* — Rachid Bendidi
(74) *Attorney, Agent, or Firm* — Loza & Loza, LLP/Qualcomm

(57) ABSTRACT

Various aspects of the disclosure relate to a request-response mechanism for sharing sensor information. For example, sensor devices (e.g., in vehicles, fixed structures, or a combination thereof) may selectively share information acquired by the sensor devices. The disclosure relates in some aspects to avoiding redundant transmissions of sensor information. For example, a sensor device of a set of sensor devices may determine which sensor device should transmit information and/or the time(s) at which that sensor device should transmit the information.

26 Claims, 13 Drawing Sheets

(51) Int. Cl.
  *G08G 1/01* (2006.01)
  *G08G 1/0967* (2006.01)
  *H04W 4/38* (2018.01)
  *H04W 4/44* (2018.01)
  *G08G 1/123* (2006.01)
  *H04W 4/14* (2009.01)
  *H04W 8/24* (2009.01)
  *H04L 29/08* (2006.01)

(56) References Cited

U.S. PATENT DOCUMENTS

2014/0009275 A1\* 1/2014 Bowers .................... B60Q 1/00
  340/436
2015/0241880 A1 8/2015 Kim et al.

\* cited by examiner

REQUEST-RESPONSE-BASED SHARING OF SENSOR INFORMATION

CROSS-REFERENCE TO RELATED APPLICATION(S)

This application claims priority to and the benefit of provisional patent application No. 62/451,393 filed in the U.S. Patent and Trademark Office on Jan. 27, 2017, the entire content of which is incorporated herein by reference.

INTRODUCTION

Various aspects described herein relate to wireless communication and, more particularly but not exclusively, to a request-response mechanism for sharing sensor information.

Self-driving cars or other driving assist mechanisms may use line-of-sight sensors such as Lidar, radar, cameras, etc., to detect objects in the vicinity of the vehicle. In practice, however, a vehicle's sensors might not be able to detect all of the objects in the vehicle's vicinity. For example, a sensor's line-of sight may be blocked (e.g., by other vehicles or the surroundings) or sensing performance may be adversely affected by weather conditions and/or lighting conditions. In addition, the vehicle may have a limited sight distance.

In some situations, there may be other sensors in the vicinity of the vehicle. Accordingly, it may be useful for the vehicle to obtain sensed information from these other sensors.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: determine at least one attribute for a request for sensor information; send the request including the at least one attribute; receive a response to the request; and identifying at least one object in a vicinity of the apparatus based on the response.

Another aspect of the disclosure provides a method for communication including: determining at least one attribute for a request for sensor information; sending the request including the at least one attribute; receiving a response to the request; and identifying at least one object in a vicinity of the apparatus based on the response.

Another aspect of the disclosure provides an apparatus configured for communication. The apparatus including: means for determining at least one attribute for a request for sensor information; means for sending the request including the at least one attribute; means for receiving a response to the request; and means for identifying at least one object in a vicinity of the apparatus based on the response.

Another aspect of the disclosure provides a non-transitory computer-readable medium storing computer-executable code, including code to: determine at least one attribute for a request for sensor information; send the request including the at least one attribute; receive a response to the request; and identifying at least one object in a vicinity of the apparatus based on the response.

In one aspect, the disclosure provides an apparatus configured for communication that includes a memory device and a processing circuit coupled to the memory device. The processing circuit is configured to: receive a request for sensor information from a requestor; identify at least one attribute of the request; sense for objects; generate a response to the request based on the sensing and the at least one attribute; determine when to send the response; and send the response according to the determination of when to send the response.

Another aspect of the disclosure provides a method for communication including: receiving a request for sensor information from a requestor; identifying at least one attribute of the request; sensing for objects; generating a response to the request based on the sensing and the at least one attribute; determining when to send the response; and sending the response according to the determination of when to send the response.

Another aspect of the disclosure provides an apparatus configured for communication. The apparatus including: means for receiving a request for sensor information from a requestor; means for identifying at least one attribute of the request; means for sensing for objects; means for generating a response to the request based on the sensing and the at least one attribute; means for determining when to send the response; and means for sending the response according to the determination of when to send the response.

Another aspect of the disclosure provides a non-transitory computer-readable medium storing computer-executable code, including code to: receive a request for sensor information from a requestor; identify at least one attribute of the request; sense for objects; generate a response to the request based on the sensing and the at least one attribute; determine when to send the response; and send the response according to the determination of when to send the response.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
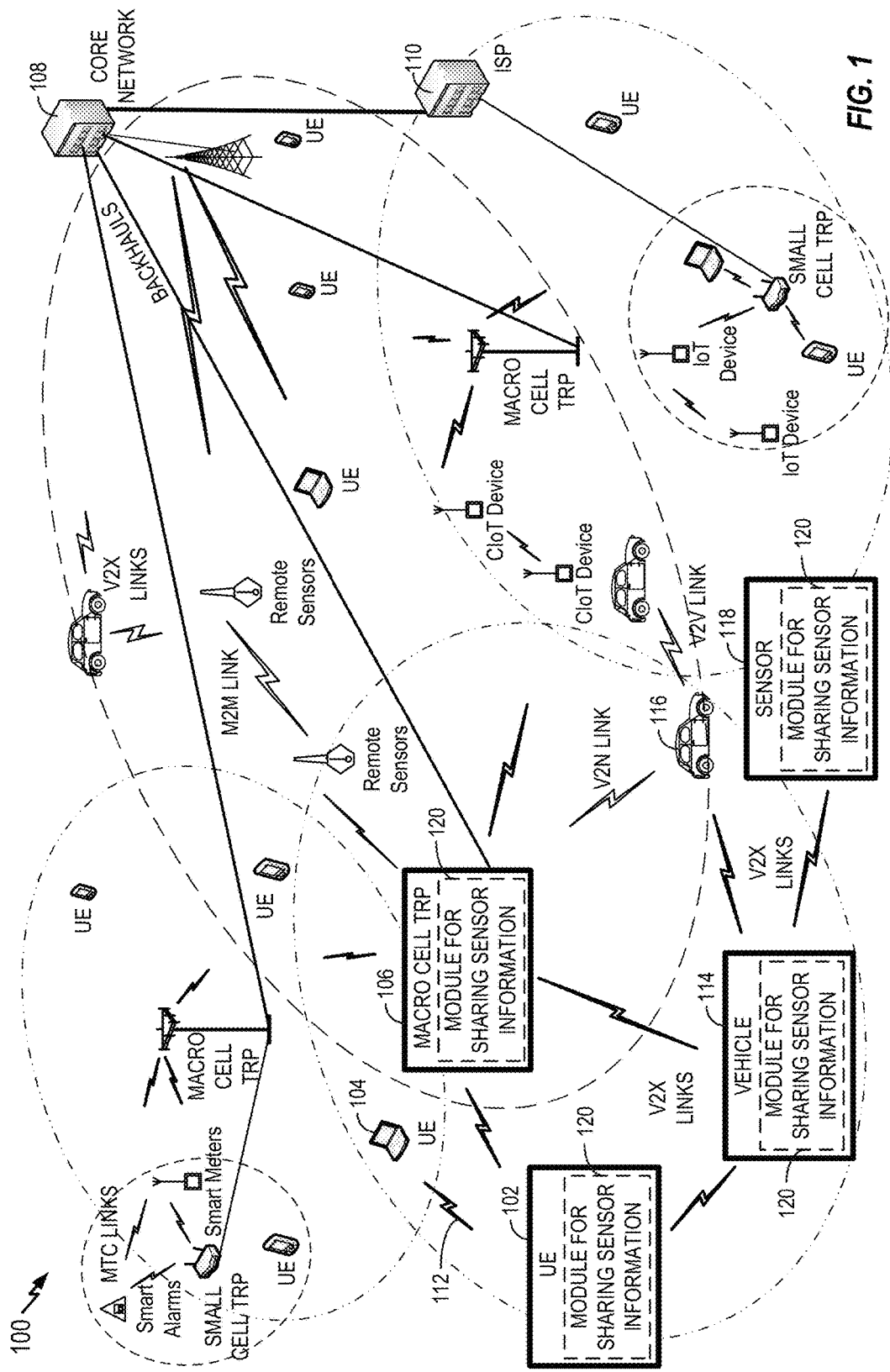
FIG. 1 illustrates an example communication system within which aspects of the disclosure may be implemented.

The disclosure relates in some aspects to a request and response scheme (hereafter, request-response scheme) for obtaining information from nearby sensors. In some aspects, the request-response scheme may employ vehicle-to-anything (V2X) communication or some other suitable communication (e.g., between moving or stationary sensing devices). Advantageously, V2X communication and other types of communication are typically not restricted to line-of-sight. Thus, a vehicle can receive sensor information from a sensor (e.g., in another vehicle) that is not in the line-of-sight of the vehicle. This can be particularly helpful for the case where two vehicles are approaching intersections. Accordingly, the disclosure relates in some aspects to using V2X communication or other suitable communication (e.g., stationary device to vehicle communication) that can be used to share sensor information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system, an LTE system, a V2X system, or a combination thereof. It should be appreciated, however, that the teachings herein may be used in other systems as well. Thus, references to functionality in the context of 5G terminology, LTE terminology, V2X terminology, or a combination thereof, should be understood to be equally applicable to other types of technology, networks, components, signaling, and so on.

Example Communication System

FIG. 1 illustrates an example of a wireless communication system 100 where a user equipment (UE), a vehicle, or some other type of device can communicate with other devices via wireless communication signaling. For example, a first UE 102 and a second UE 104 may communicate with a transmit receive point (TRP) 106 using wireless communication resources managed by the TRP 106 and/or other network devices (e.g., a core network 108, an internet service provider (ISP) 110, peer devices, and so on).

In some cases, devices of the system 100 may communicate with each other directly via a direct link 112 (e.g., a unicast link, a broadcast link, or a multicast link). A direct link may take the form of, for example, a vehicle-to-anything (V2X) link or a device-to-device (D2D) link. As shown in FIG. 1, a first vehicle 114 may communicate via V2X communication (or via a similar form of communication such as a vehicle-to-vehicle (V2V) communication or vehicle-to-network (V2N) communication) with a second vehicle 116, the UE 102, a sensor 118, the TRP 106, or some other device (e.g., component) of the system 100.

In accordance with the teachings herein, devices of the system 100 may include functionality for sharing sensor information. There may be several issues relating to the sharing of sensor information. For example, for a particular location or geographical area there may be several vehicles sensing the same information such as an obstacle or a pedestrian. If all of the vehicles transmitted the information, the communication could be relatively inefficient (e.g., redundant information could be transmitted by multiple vehicles). The transmission of large amounts of data (e.g., from high definition cameras) could also result in the required data rate being relatively high and it could be challenging to meet data transfer requirements for such data. In view of the above, the disclosure relates in some aspects to determining which vehicle should transmit information and the time(s) at which the vehicle should transmit the information. To this end, each of the first vehicle 114, the UE 102, the sensor 118, the TRP 106, or any other component of the system 100, may include a module for sharing sensor information 120.

The devices and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of links may be supported in the wireless communication system 100. For example, D2D links may include, without limitation, machine-to-machine (M2M) links, MTC links, V2V links, and V2X links. Network-to-device links may include, without limitation, uplinks (or reverse links), downlinks (or forward links), V2N links, and V2X links. Broadcast links may include, without limitation, V2V links, V2X links, M2M links, and MTC links. In some aspects, V2V and V2N communication may be considered as examples of V2X communication.

Example Vehicle System

Figure 2:
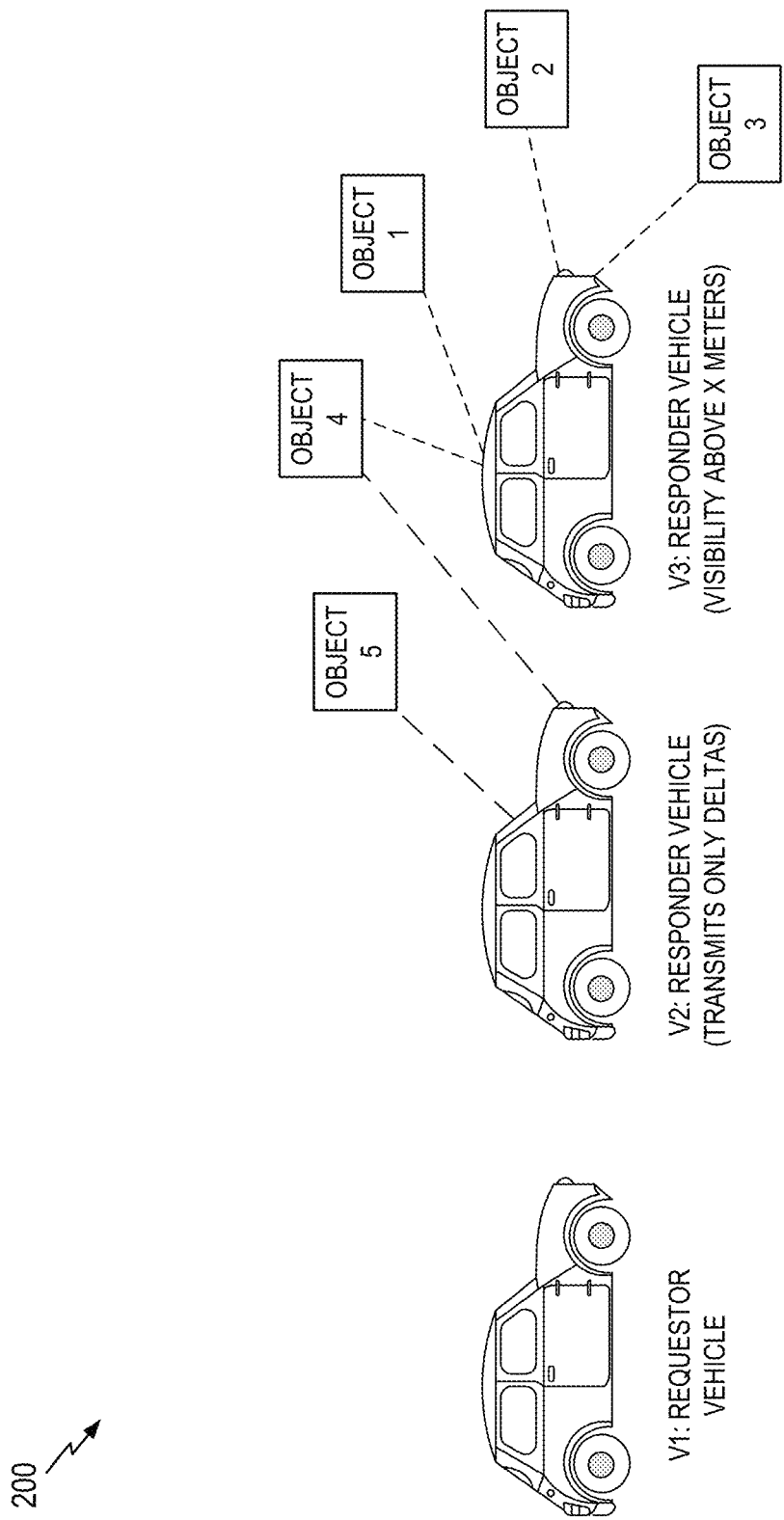
FIG. 2 illustrates an example communication system employing object sensing within which aspects of the disclosure may be implemented.

FIG. 2 illustrates a communication system 200 that uses a request-response scheme for sharing sensor information. The communication system 200 includes vehicles that can sense objects in their vicinity and share the sensed information. In the scenario of FIG. 2, a forward view of a first vehicle V1 is partially blocked by a second vehicle V2 and a third vehicle V3. In addition, a forward view of the second vehicle V2 is partially blocked by the third vehicle V3. The sensors of the third vehicle V3 can detect the objects 1, 2, 3, and 4. The sensors of the second vehicle V2 can detect the objects 4 and 5. The sensors of the first vehicle cannot detect any of the objects 1, 2, 3, 4 or 5. In such a scenario, is it desirable for V1 to request sensor information from V2 and V3.

Example Timeline

The disclosure relates in some aspects to a request-response scheme that enables vehicles to share sensor data. Advantageously, this may be accomplished while reducing redundant sharing of data (flooding). In various aspects, the request-response scheme may use certain triggers to invoke sharing, may specify various types of information to share, may specify the detected objects to be reported (e.g., objects within a specified distance, in a particular direction, etc.), and may specify the type of data to be shared (e.g., object indicators, raw data such as a camera feed, etc.).

Figure 3:
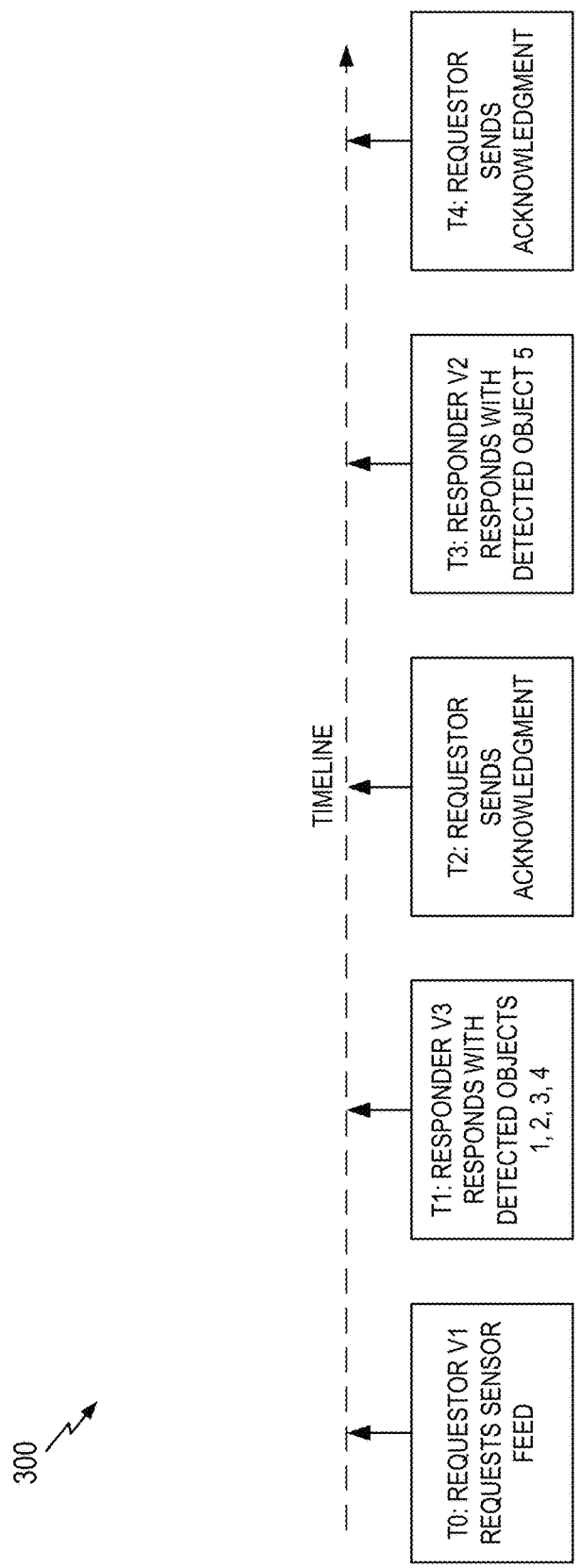
FIG. 3 illustrates an example timeline for the communication system of FIG. 2.

FIG. 3 illustrates a timeline 300 for one example of a request-response scheme for sharing sensor information in the scenario of FIG. 1. At time T0, the first vehicle V1 (the requestor in this scenario) sends a message (e.g., via a common channel such as a V2V communication channel used by the first vehicle V1, the second vehicle V2, and the third vehicle V3) requesting the sensor feed from any nearby vehicles. The first vehicle V2 and the second vehicle V3 (and any other nearby vehicles or devices configured to communicate on the channel) can receive this request message. At time T1, the third vehicle V3 (a responder in this scenario) responds with sensor information indicating detected objects 1, 2, 3, and 4 (e.g., the third vehicle V3 sends a response via the common channel). The first vehicle V1 and the second vehicle V2 (and any other nearby vehicles or devices configured to communicate on the channel) can receive this response message. As discussed in more detail below, the third vehicle V3 may respond first in this scenario because the visibility of it sensors reaches farther than the visibility of the sensors of the second vehicle V2. At time T2, the first vehicle V1 sends a message acknowledging receipt of the response from the third vehicle V3 (e.g., the first vehicle V1 sends an ACK via the common channel). At time T3, the second vehicle V2 (a responder in this scenario) responds with sensor information indicating detected object 5 (e.g., the second vehicle V2 sends a response via the common channel). Advantageously, the second vehicle V2 monitors the response from the third vehicle V3 at time T1 as discussed above and does not duplicate the information that was already sent by the third vehicle V3. That is, the second vehicle V2 transmits only the object data that has not been previously detected and reported (e.g., within a particular window of time corresponding to the request). As discussed herein, information (e.g., for a particular object) is thereby transmitted only once to avoid flooding (e.g., to avoid multiple vehicles transmitting redundant information). At time T4, the first vehicle V1 sends a message acknowledging receipt of the response from the second vehicle V2 (e.g., the first vehicle V1 sends an ACK via the common channel).

Example Protocol

The disclosure relates in some aspects to a request-response protocol for sharing sensor information. In some aspects, a responder may be configured to only transmit its sensor data (e.g., object information or raw data) in response to a request for the sensor data.

The request may take different forms in different scenarios. A request may request various types of information. A request may include various types of information.

In some aspects, a request can indicate that a response should indicate all objects that were detected or only a subset of these objects. As an example of the latter case, a request might request that only objects in the requestor's blind spot be reported. In this case, the request may specify the region for which objects are to be reported (e.g., by including an indication of the blind spot). For example, the request may describe the region as at least one of: a set of coordinates, a direction (e.g., an angle), a span relative to the direction, a center point, a zone around the center point, a range, or any combination thereof. As another example of the latter case, a request might request that only objects within a certain distance from the requestor be reported. As yet another example of the latter case, a request might request that only objects that have not already been reported (i.e., the delta) be reported. Alternatively, any of the above behaviors could be a default behavior.

A request may include the vehicle's location. A responder could use this location information to determine, for example, whether the responder is close enough to the requestor to warrant a response (e.g., based on a system-defined threshold or a threshold provided by the requestor).

A request may request a specific sensor feed. For example, a request may ask for an indication of detected objects, raw Lidar data (e.g., a Lidar feed), raw camera data (e.g., a camera feed), raw radar data (e.g., a radar feed), or any combination thereof.

A request may indicate a period of time over which the sensor feed is required. The designated period of time may depend, for example, on the speed of the requesting vehicle and/or the speed of the responding vehicle.

A request can request a sensor feed for a certain direction. For example, the request may ask a requestor to sense at a certain angle from a current orientation and report that information.

A requestor vehicle may receive a Basic Safety Message (BSM). Thus, the requestor may be aware of the presence of different vehicles in the vicinity (along with the location, direction, and speed of each vehicle in some cases).

Consequently, a request may indicate a distance (e.g., Y meters) so that any vehicle within that distance from the requestor starts transmitting sensor data first (i.e., sooner than vehicles that are further away). Subsequently, the distance may be increased so the requestor can obtain visibility up to a certain distance (e.g., the vehicles that are further away from the requestor will report their information once the distance is increased). As another example, the request may specify the order in which the vehicles in the vicinity are to respond (e.g., the third vehicle V3 responds first, the second vehicle V2 responds second, and so on).

A responder may perform various operations based on a received request. For example, a response may be based on information included in the request and/or one or more characteristics (e.g., location, visibility, etc.) of the responders.

In one scenario, the first requestor is a vehicle that has visibility above X meters. That is, by default (e.g., according to a threshold X specified by the system or the requestor), the vehicles that can "see" the furthest report first. Such a requestor may transmit (e.g., broadcast) an indication of all objects it has detected (or a designated subset of these objects).

In some aspects, the visibility of a vehicle may depend on the sensors used by that vehicle. For example, Lidar may have a visibility of 150 meters, a camera may have an effective visibility of 100 meters, and so on. These examples are for purposes of illustration. Other visibility distances could apply in other scenarios.

If no vehicles have visibility above X meters, X may be reduced over time (e.g., by an amount designated by the system or the requestor) to allow some other vehicle to transmit. This step may occur within a latency period (e.g., a period of time designated by the system or the requestor for determining whether there has been an initial response). For example, Y seconds after the request is sent, each of the responder vehicles may reduce X by a delta Z if none of the vehicles have responded to the request. In an alternative implementation, the requestor may send another request with a smaller X if no responses have been received after a certain period of time (e.g., Y seconds).

Alternatively or in addition, different vehicles could pick a random delay-in-response (a back-off value) to determine when to transmit. The random delay could depend on the amount of data to be transmitted in the response or some other factor (e.g., proximity to the requestor, etc.). Thus, in this case, the first vehicle to respond may be the one with the shortest random delay value. A random back-off may be used, for example, to prevent different vehicles that meet the same reporting time criterion (e.g., visibility above X) from reporting at the same time.

After the first vehicle sends a response, other vehicles in the area may transmit (e.g., broadcast) their responses (e.g., at times based on their respective reporting time criteria, if applicable). As discussed above, to improve system efficiency, these vehicles might only send deltas above and beyond what any prior vehicles transmitted. For example, if the three vehicles detected the same object, only the first responder would report this object in this case.

After all of the responses have been sent, the vehicle that requested the sensor feed may send one or more acknowledgments (e.g., separate ACKs to each responder, a global ACK, collective ACKs, etc.). The requestor may send an acknowledgment at, for example, the physical (PHY) layer or the application layer. Advantageously, this can provide for higher reliability on top of PHY layer re-transmission.

If a responder does not receive an acknowledgment from the requestor, the responder can retransmit its response. In some case, the responder may respond with its full information (rather than the delta) if the requestor did not acknowledge any of the responses.

Example Communication System

Figure 4:
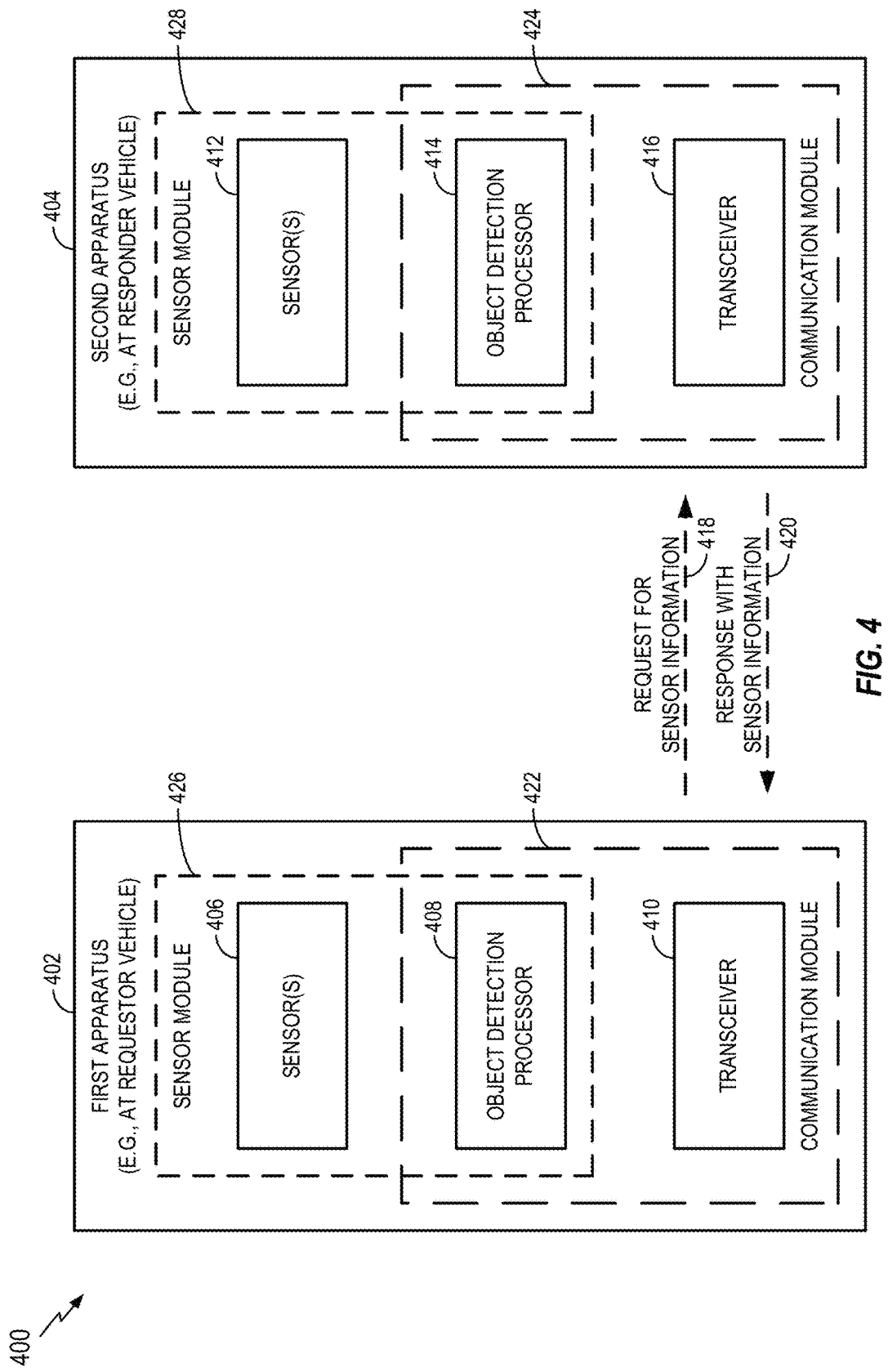
FIG. 4 illustrates an example communication system that uses a request-response scheme for communicating sensor information in accordance with some aspects of the disclosure.

FIG. 4 illustrates a communication system 400 that includes a first apparatus 402 and a second apparatus 404. The first apparatus 402 and the second apparatus 404 may correspond to, for example, the vehicles of FIG. 1, 2, or 3. For example, the first apparatus 402 may be in a first vehicle and the second apparatus 404 may be in a second vehicle. The first apparatus 402 and the second apparatus 404 may communicate via a communication link such as, for example, a V2X link, an enhanced V2X (eV2X) link, or some other suitable communication link (e.g., a V2V link, a V2N link, a D2D link, etc.).

The apparatuses of the communication system 400 may access other peer communication apparatuses, other communication apparatuses of an associated wide area network, or communication devices in other networks (not shown). To reduce the complexity of FIG. 4, only two apparatuses are shown. In practice, a wireless communication system may include more of these apparatuses. In some implementations, the first apparatus 402 may correspond to the first vehicle 114 of FIG. 1. In addition, the second apparatus 404 may correspond to the second vehicle 116, the sensor 118, the UE 102, or some other device of FIG. 1.

The first apparatus 402 includes at least one sensor 406 for sensing objects in the vicinity (e.g., within a particular range) of the first apparatus 402. For example, the at least one sensor 406 may incorporate Lidar, radar, camera, or some other suitable object sensor technology. The first apparatus 402 also includes an object detection processor 408 for processing information received from the at least one sensor 406 (or another sensing device) to make an object detection decision and take action upon determining that an object has been detected. In addition, the first apparatus 402 includes a transceiver 410 for communicating with other apparatuses (e.g., other vehicles or devices with sensors). In some implementations, the transceiver 410 provides V2X or V2V communication.

The second apparatus 404 includes at least one sensor 412, an object detection processor 414, and a transceiver 416 similar to the first apparatus 402. In the example, of FIG. 4, the first apparatus 402 transmits a request 418 for sensor information. For example, the object detection processor may determine that the view of the at least one sensor 406 is partially blocked and therefore request additional sensor data from its neighbors. In response, the second apparatus 404 sends a response 420 that includes the sensor information sensed by the at least one sensor 412 and/or processed object information (e.g., object information) generated by the object detection processor 414. As an example of the latter case, the object detection processor 414 may process raw data provided by the at least one sensor 412 to identify any objects in the field of view and/or the specific location of each object. Here, a location may be indicated by geographic coordinates, a direction, a distance, a direction and a distance, or some other location parameter(s). In addition, the object detection processor 414 may indicate the type of object detected (e.g., a car, a bicycle, a pedestrian, etc.).

The teachings herein may be implemented in an apparatus or a subcomponent of an apparatus. As one example, the first apparatus 402 and/or the second apparatus 404 of FIG. 4 could be a vehicle that provides some or all of the functionality described herein. In this case, the vehicle could identify nearby objects and transmit an indication thereof and/or the vehicle could receive sensor information from another apparatus and take action accordingly. Alternatively, the first apparatus 402 could be a component of a first vehicle and/or the second apparatus 404 could be a component of a second vehicle.

As another example, a communication module of an apparatus could provide some or all of the functionality described herein. FIG. 4 illustrates an example where the first apparatus 402 may be optionally configured with a communication module 422 that includes at least some of the functionality of the object detection processor 408 and the transceiver 410, and where the second apparatus 404 may be optionally configured with a communication module 424 that includes at least some of the functionality of the object detection processor 414 and the transceiver 416.

As yet another example, a sensor module of an apparatus could provide some or all of the functionality described herein. FIG. 4 illustrates an example where the first apparatus 402 may be optionally configured with a sensor module 426 that includes at least some of the functionality of the object detection processor 408 and the at least one sensor 406, and where the second apparatus 404 may be optionally configured with a communication module 428 that includes at least some of the functionality of the object detection processor 414 and the at least one sensor 412.

The teachings herein may be implemented in a wide variety of apparatuses. For example, as mentioned above, a vehicle or a component of a vehicle may provide some or all of the functionality described herein. As used herein, a vehicle can include any type of propelled apparatus including, without limitation, an automobile, a truck, an off-road vehicle, a motorcycle, a boat, an aircraft (e.g., a drone, etc.) a robot, or a conveyance device (e.g., for an automated factory, warehouse, or other use). Other types of apparatuses that are capable of communication could also provide some or all of the functionality described herein. For example, a cell phone or other wireless communication device (e.g., including at least one sensor) could identify nearby objects and send an indication thereof to another device. As another example, a cell phone or other wireless communication device could receive sensor information from another device and take action accordingly. For example, the cell phone or other device could display an indication about nearby objects, generate some other form of alert (e.g., an audible alert), send a control signal to another device (e.g., a control system of a vehicle), or forward the sensor information to another device. Also at least some of the functionality described herein could be implemented through the use of an application (app) that can be downloaded to a device (e.g., a cell phone, a computer, or some other type of wireless communication device) to enable the device to provide the corresponding functionality.

Example Processes

Figure 5:
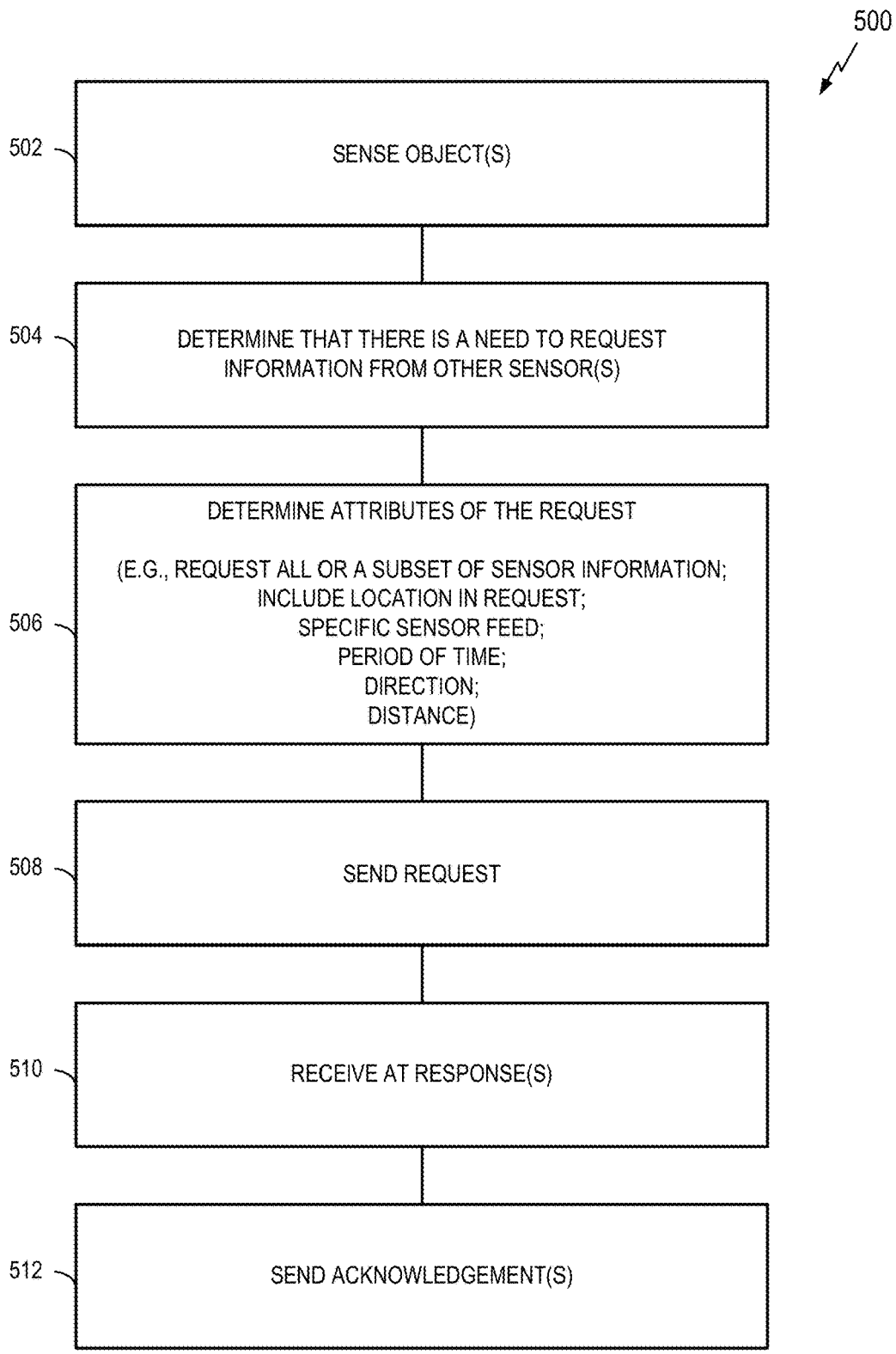
FIG. 5 is a flowchart illustrating an example of a process for requesting sensor information in accordance with some aspects of the disclosure.

FIG. 5 illustrates a process 500 for communication in accordance with some aspects of the disclosure. The process 500 may take place within a processing circuit (e.g., the processing circuit 910 of FIG. 9), which may be located in a vehicle, a component of a vehicle, a communication device, a sensor device, a peer-to-peer device, a UE, a customer premises equipment (CPE), a gNB, a transmit receive point (TRP), a base station (BS), an eNode B (eNB), or some other suitable apparatus of a requestor (e.g., a requestor vehicle). In some aspects, the process 500 may be performed by the first apparatus 402 of FIG. 4. For example, block 402 may be performed by the at least one sensor 406, blocks 404 and 406 may be performed by the object detection processor 408, and blocks 408 and 410 may be performed by the transceiver 410. Of course, in various aspects within the scope of the disclosure, the process 500 may be implemented by any suitable apparatus capable of supporting communication-related operations.

At block 502, an apparatus (e.g., a requestor vehicle) senses at least one object.

At block 504, the apparatus determines that there is a need to request information from another sensor or other sensors.

At block 506, the apparatus determines attributes for the request. For example, a request may request all sensor information or a subset of sensor information (e.g., only sensor information for a current blind spot). In addition, a location of the requestor may be included in the request (e.g., to enable a responder to determine where to sense). A request may request a specific sensor feed (e.g., to obtain sensor information from a particular type of sensor and/or from a particular location). A request may specify a period of time (e.g., for responding to the request). A request may indicate a direction for the sensing. A request may specify a distance (e.g., to control which responders respond to the request).

At block 508, the apparatus sends (e.g., transmits) the request.

At block 510, the apparatus receives at least one response to the request.

At block 512, the apparatus sends (e.g., transmits) an acknowledgment upon receiving the response(s).

In some aspects, a process may include any combination of two or more of the operations of FIG. 5.

Figure 6:
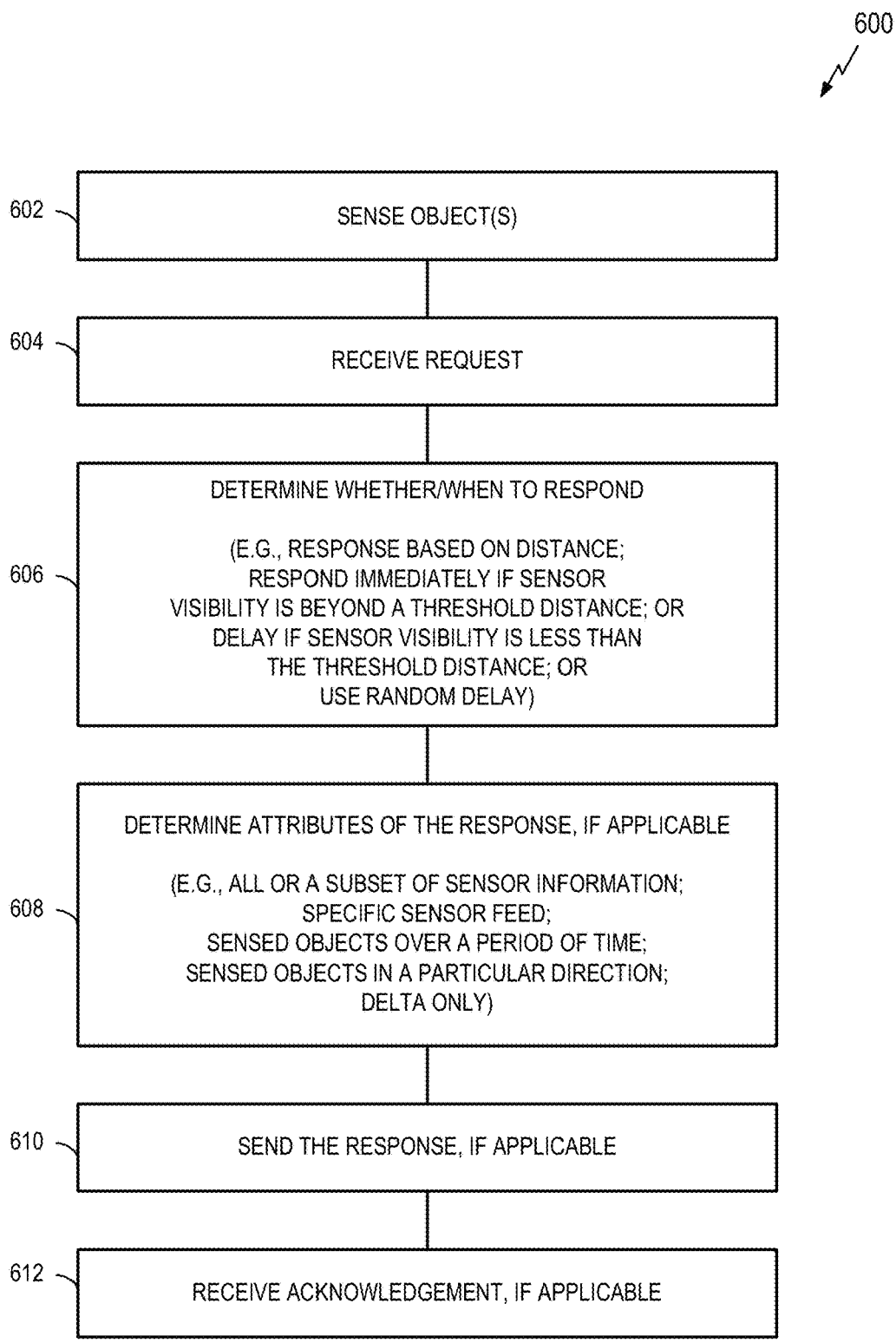
FIG. 6 is a flowchart illustrating an example of a process for responding to a request for sensor information in accordance with some aspects of the disclosure.

FIG. 6 illustrates a process 600 for communication in accordance with some aspects of the disclosure. In some aspects, the process 600 may complementary to the process 500 of FIG. 5. For example, the process 600 may be performed in response to the process 500. The process 600 may take place within a processing circuit (e.g., the processing circuit 1110 of FIG. 11), which may be located in a vehicle, a component of a vehicle, a communication device, a sensor device, a peer-to-peer device, a UE, a CPE, a gNB, a transmit receive point (TRP), a base station (BS), an eNode B (eNB), or some other suitable apparatus of a responder (e.g., a responder vehicle). In some aspects, the process 600 may be performed by the second apparatus 404 of FIG. 4. For example, block 602 may be performed by the at least one sensor 412, blocks 606 and 608 may be performed by the object detection processor 414, and blocks 604, 610, and 612 may be performed by the transceiver 416. Of course, in various aspects within the scope of the disclosure, the process 600 may be implemented by any suitable apparatus capable of supporting communication-related operations.

At block 602, at some point in time, an apparatus (e.g., a responder vehicle) may sense at least one object.

At block 604, the apparatus receives a request for its sensed information. In response to this request, the apparatus may conduct another sense operation (e.g., as in block 602).

At block 606, the apparatus determines whether to respond to the request. For example, the apparatus may respond based on the distance of the apparatus from the requestor. As another example, the apparatus may respond immediately if the apparatus's sensor visibility is beyond a threshold distance (e.g., X meters). As yet another example, the apparatus may delay responding if the apparatus's sensor visibility is less than the threshold distance. Alternatively or in addition, the apparatus may use a random delay to determine when to respond.

At block 608, if the apparatus elects to respond at block 606, the apparatus determines the attributes of its response. For example, the apparatus may elect to send all of its sensor information or a subset of its sensor information (e.g., pursuant to the request or a delta). As another example, the apparatus may elect to send a specific sensor feed (e.g., pursuant to the request). As yet another example, the apparatus may elect to send sensor information for a specific period of time and/or for a particular direction (e.g., pursuant to the request). Also, if the apparatus does not detect any objects, the apparatus may report this in the response.

At block 610, the apparatus sends the response, if applicable.

At block 612, the apparatus receives an acknowledgment to the response, if applicable.

In some aspects, a process may include any combination of two or more of the operations of FIG. 6.

Example Autonomously Controlled Apparatus

Figure 7:
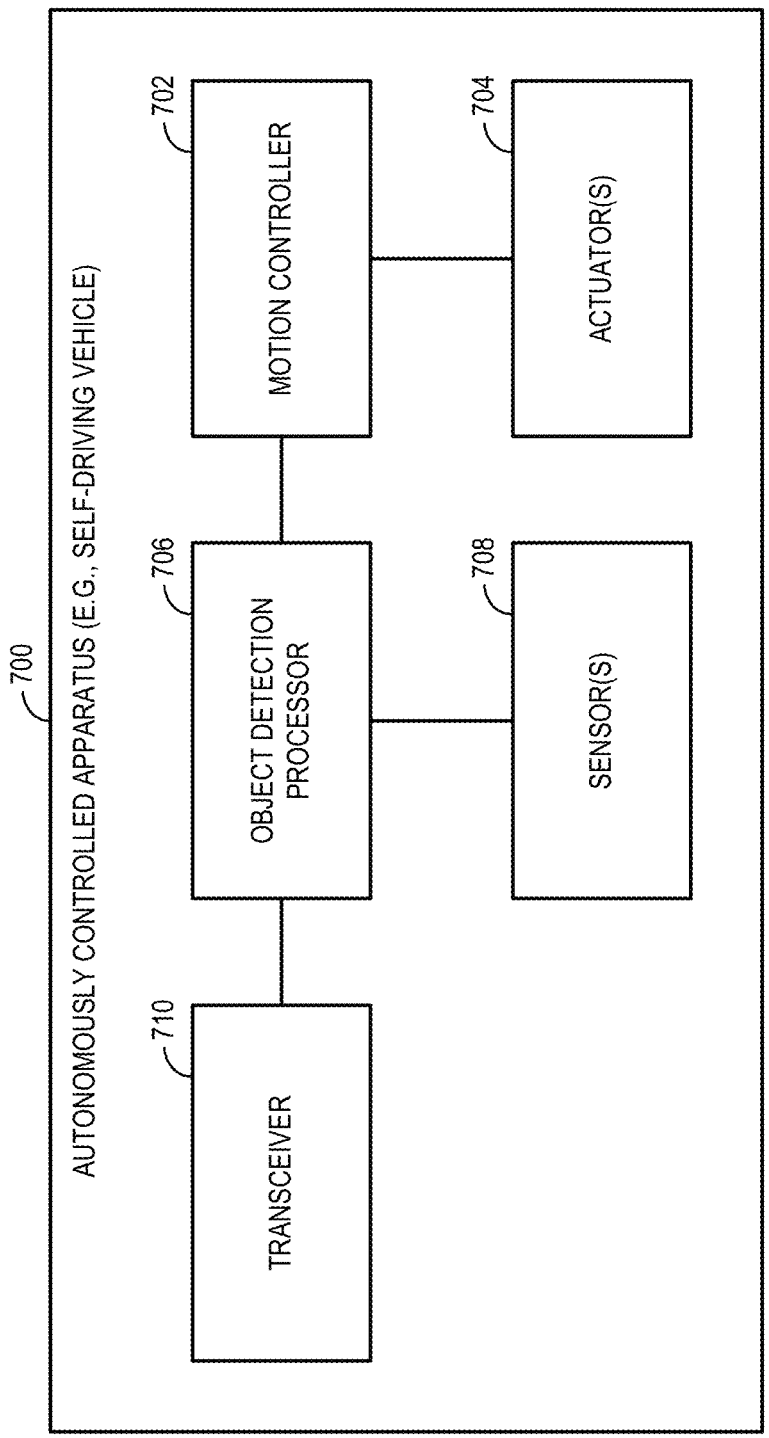
FIG. 7 illustrates an example autonomously controlled apparatus (e.g., vehicle) in accordance with some aspects of the disclosure.

The teachings herein may be implemented in an autonomously controlled apparatus. FIG. 7 illustrates an example of an autonomously controlled apparatus 700 (e.g., a self-driving vehicle). The apparatus 700 may correspond to, for example, the first apparatus 402 or the second apparatus 404 of FIG. 4.

The apparatus 700 includes a motion controller 702 that autonomously controls at least one actuator 704. The at least one actuator 704 may take the form of, for example, a motor and associated wheels, or some other mechanism that is capable of moving the apparatus 700.

In accordance with the teachings herein, the motion controller 702 may take nearby objects into account when deciding whether and/or how to move the apparatus 700. To this end, an object detection processor 706 identifies objects in the vicinity of the apparatus 700 and provides information about these objects to the motion controller 702. As discussed herein, the object detection processor 706 processes information received from one or more sensors to make an object detection decision and take action upon determining whether or not an object has been detected. For example, the object detection processor 706 may receive sensor information from at least one sensor 708 associated with the apparatus 700. Alternatively, or in addition, the object detection processor 706 may obtain sensor information received by a transceiver 710 from other apparatuses (e.g., other vehicles or devices with sensors) through the use of a request-response scheme as taught herein.

Example Semi-autonomously Controlled Apparatus

Figure 8:
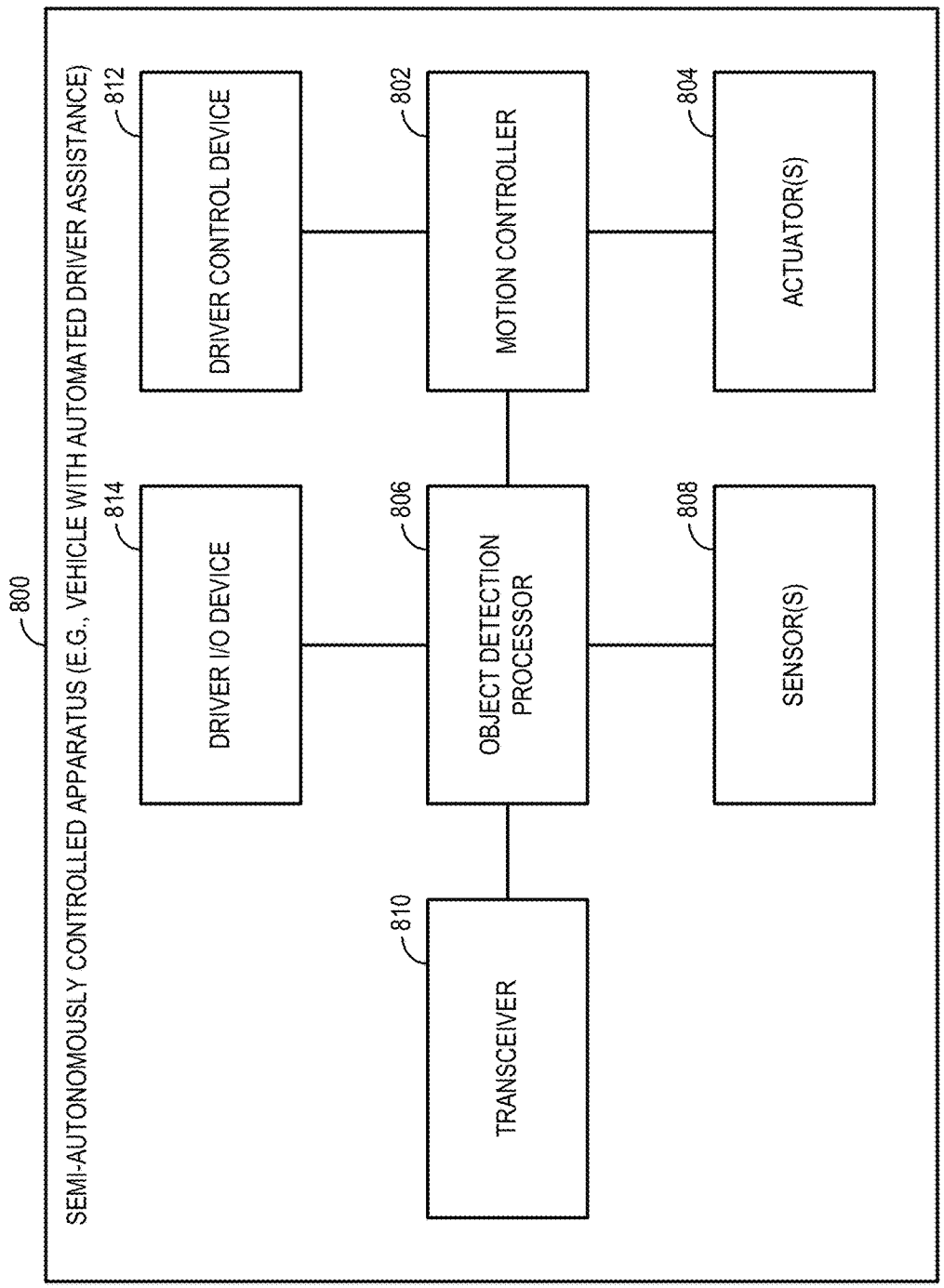
FIG. 8 illustrates an example semi-autonomously controlled apparatus (e.g., vehicle) in accordance with some aspects of the disclosure.

The teachings herein may be implemented in a semi-autonomously controlled apparatus. FIG. 8 illustrates an example of an autonomously controlled apparatus 800 (e.g., a vehicle with automated driver assistance). The apparatus 800 may correspond to, for example, the first apparatus 402 or the second apparatus 404 of FIG. 4.

The apparatus 800 includes a motion controller 802 that semi-autonomously controls at least one actuator 804. For example, similar to the apparatus 700 of FIG. 7, an object detection processor 806 identifies objects in the vicinity of the apparatus 800 and provides information about these objects to the motion controller 802. In addition, the motion controller 802 may receive signals from a driver control device 812 (e.g., a steering controller, an acceleration controller, a braking controller, a cell phone, etc.) that is actuated by a driver.

Similar to the apparatus 700 of FIG. 7, the object detection processor 806 processes information received from one or more sensors to make an object detection decision and take action upon determining whether or not an object has been detected. For example, the object detection processor 806 may receive sensor information from at least one sensor 808 associated with the apparatus 800. Alternatively, or in addition, the object detection processor 806 may obtain sensor information received by a transceiver 810 from other apparatuses (e.g., other vehicles or devices with sensors) through the use of a request-response scheme as taught herein. The object detection processor 806 could also provide information about nearby objects to a driver input/output (I/O) device 814 (e.g., a display screen, a speaker, a vibration device, a cell phone, etc.) to alert the driver about the nearby objects.

First Example Apparatus

Figure 9:
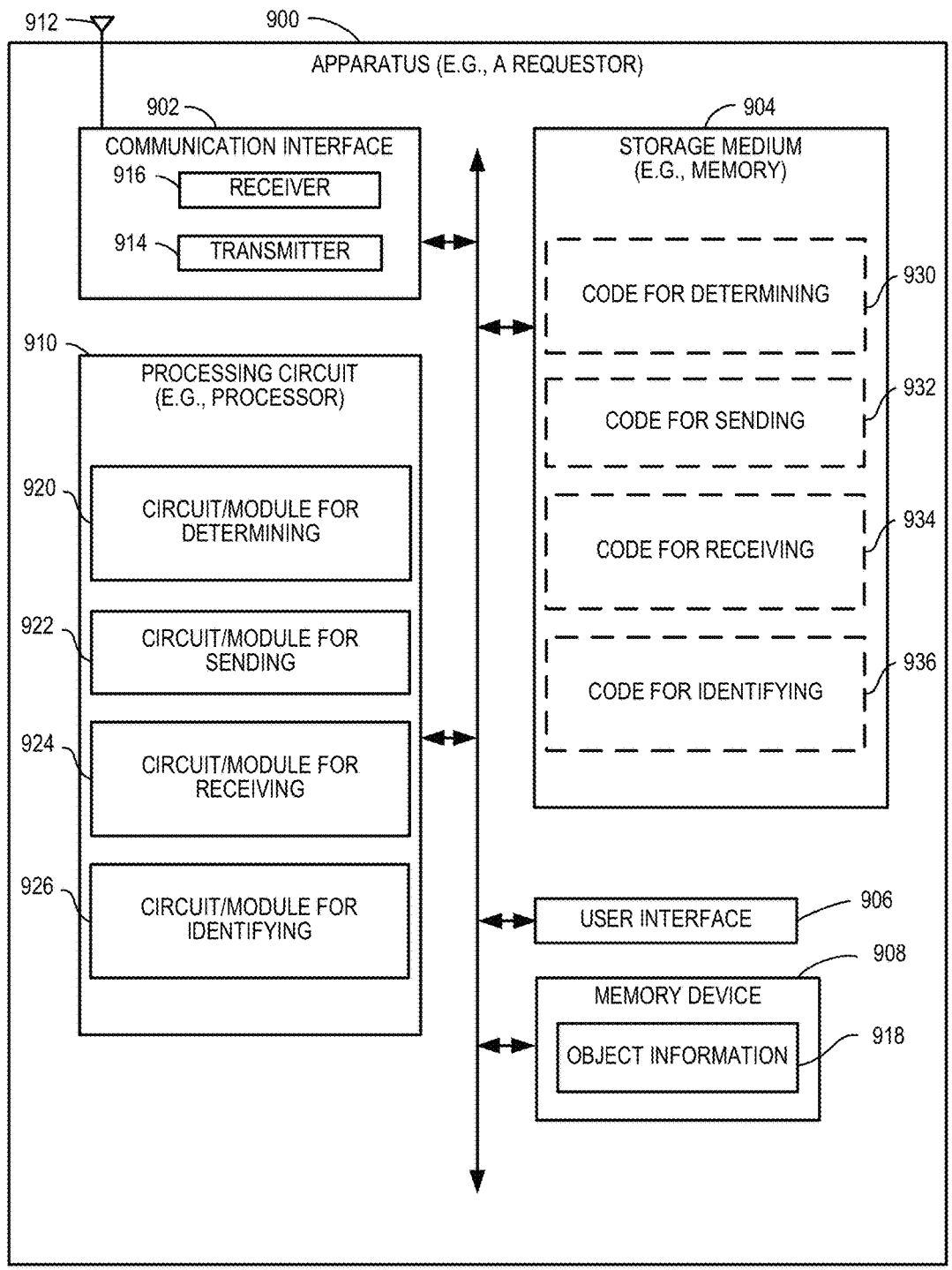
FIG. 9 is a block diagram illustrating an example hardware implementation for an apparatus (e.g., an electronic device) that can support communication in accordance with some aspects of the disclosure.

FIG. 9 illustrates a block diagram of an example hardware implementation of an apparatus 900 configured to communicate according to one or more aspects of the disclosure.

The apparatus 900 could embody or be implemented within a vehicle, a component of a vehicle, a communication module, a sensor module, a sensor device, a peer-to-peer device, a UE, a CPE, a gNB, a transmit receive point (TRP), a base station (BS), a eNode B (eNB), or some other type of device that supports wireless communication. In various implementations, the apparatus 900 could embody or be implemented within an access point, an access terminal, or some other type of device. In various implementations, the apparatus 900 could embody or be implemented within a server, a personal computer, a mobile phone, a smart phone, a tablet, a portable computer, a network entity, a machine, a sensor, an entertainment device, a medical device, or any other electronic device having circuitry.

The apparatus 900 includes a communication interface (e.g., at least one transceiver) 902, a storage medium 904, a user interface 906, a memory device (e.g., a memory circuit) 908, and a processing circuit 910 (e.g., at least one processor). In various implementations, the user interface 906 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 9. The signaling bus may include any number of interconnecting buses and bridges depending on the specific application of the processing circuit 910 and the overall design constraints. The signaling bus links together various circuits such that each of the communication interface 902, the storage medium 904, the user interface 906, and the memory device 908 are coupled to and/or in electrical communication with the processing circuit 910. The signaling bus may also link various other circuits (not shown) such as timing sources, peripherals, voltage regulators, and power management circuits, which are well known in the art, and therefore, will not be described any further.

The communication interface 902 provides a means for communicating with other apparatuses over a transmission medium. In some implementations, the communication interface 902 is adapted to facilitate wireless communication of the apparatus 900. For example, the communication interface 902 may include circuitry and/or programming adapted to facilitate the communication of information bi-directionally with respect to one or more communication devices in a network. Thus, in some implementations, the communication interface 902 may be coupled to one or more antennas 912 as shown in FIG. 9 for wireless communication within a wireless communication system. In some implementations, the communication interface 902 may be configured for wire-based communication. For example, the communication interface 902 could be a bus interface, a send/receive interface, or some other type of signal interface including drivers, buffers, or other circuitry for outputting and/or obtaining signals (e.g., outputting signal from and/or receiving signals into an integrated circuit). The communication interface 902 can be configured with one or more standalone receivers and/or transmitters, as well as one or more transceivers. In the illustrated example, the communication interface 902 includes a transmitter 914 and a receiver 916. The communication interface 902 serves as one example of a means for receiving and/or means transmitting.

The memory device 908 may represent one or more memory devices. As indicated, the memory device 908 may maintain object information 918 along with other information used by the apparatus 900. In some implementations, the memory device 908 and the storage medium 904 are implemented as a common memory component. The memory device 908 may also be used for storing data that is manipulated by the processing circuit 910 or some other component of the apparatus 900.

The storage medium 904 may represent one or more computer-readable, machine-readable, and/or processor-readable devices for storing programming, such as processor executable code or instructions (e.g., software, firmware), electronic data, databases, or other digital information. The storage medium 904 may also be used for storing data that is manipulated by the processing circuit 910 when executing programming. The storage medium 904 may be any available media that can be accessed by a general purpose or special purpose processor, including portable or fixed storage devices, optical storage devices, and various other mediums capable of storing, containing or carrying programming.

By way of example and not limitation, the storage medium 904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 904 may be embodied in an article of manufacture (e.g., a computer program product). By way of example, a computer program product may include a computer-readable medium in packaging materials. In view of the above, in some implementations, the storage medium 904 may be a non-transitory (e.g., tangible) storage medium.

The storage medium 904 may be coupled to the processing circuit 910 such that the processing circuit 910 can read information from, and write information to, the storage medium 904. That is, the storage medium 904 can be coupled to the processing circuit 910 so that the storage medium 904 is at least accessible by the processing circuit 910, including examples where at least one storage medium is integral to the processing circuit 910 and/or examples where at least one storage medium is separate from the processing circuit 910 (e.g., resident in the apparatus 900, external to the apparatus 900, distributed across multiple entities, etc.).

Programming stored by the storage medium 904, when executed by the processing circuit 910, causes the processing circuit 910 to perform one or more of the various functions and/or process operations described herein (e.g., a non-transitory computer-readable medium may store computer-executable code, including code to perform one or more of the operations described herein). For example, the storage medium 904 may include operations configured for regulating operations at one or more hardware blocks of the processing circuit 910, as well as to utilize the communication interface 902 for wireless communication utilizing their respective communication protocols.

The processing circuit 910 is generally adapted for processing, including the execution of such programming stored on the storage medium 904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 910 is arranged to obtain, process and/or send data, control data access and storage, issue commands, and control other desired operations. The processing circuit 910 may include circuitry configured to implement desired programming provided by appropriate media in at least one example. For example, the processing circuit 910 may be implemented as one or more processors, one or more controllers, and/or other structure configured to execute executable programming Examples of the processing circuit 910 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 910 are for illustration and other suitable configurations within the scope of the disclosure are also contemplated.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIG. 1-7 or 10. As used herein, the term "adapted" in relation to the processing circuit 910 may refer to the processing circuit 910 being one or more of configured, employed, implemented, and/or programmed to perform a particular process, function, operation and/or routine according to various features described herein.

The processing circuit 910 may be a specialized processor, such as an application-specific integrated circuit (ASIC) that serves as a means for (e.g., structure for) carrying out any one of the operations described in conjunction with FIG. 1-7 or 10. The processing circuit 910 serves as one example of a means for transmitting and/or a means for receiving. In various implementations, the processing circuit 910 may provide and/or incorporate the functionality of the first apparatus 402 of FIG. 4, the apparatus 700 of FIG. 7, or the apparatus 800 of FIG. 8.

According to at least one example of the apparatus 900, the processing circuit 910 may include one or more of a circuit/module for determining 920, a circuit/module for sending 922, a circuit/module for receiving 924, or a circuit/module for identifying 926. In various implementations, the circuit/module for determining 920, the circuit/module for sending 922, the circuit/module for receiving 924, or the circuit/module for identifying 926 may provide and/or incorporate the functionality of the first apparatus 402 of FIG. 4.

As mentioned above, programming stored by the storage medium 904, when executed by the processing circuit 910, causes the processing circuit 910 to perform one or more of the various functions and/or process operations described herein. For example, the programming may cause the processing circuit 910 to perform the various functions, steps, and/or processes described herein with respect to FIG. 1-7 or 10 in various implementations. As shown in FIG. 9, the storage medium 904 may include one or more of code for determining 930, code for sending 932, code for receiving 934, or code for identifying 936. In various implementations, the code for determining 930, the code for sending 932, the code for receiving 934, or the code for identifying 936 may be executed or otherwise used to provide the functionality described herein for the circuit/module for determining 920, the circuit/module for sending 922, the circuit/module for receiving 924, or the circuit/module for identifying 926.

The circuit/module for determining 920 may include circuitry and/or programming (e.g., code for determining 930 stored on the storage medium 904) adapted to perform several functions relating to, for example, determining an attribute. In some aspects, the circuit/module for determining 920 (e.g., a means for determining) may correspond to, for example, a processing circuit.

Initially, the circuit/module for determining 920 may obtain information upon which the determination is to be based. For example, the circuit/module for determining 920 may obtain information (e.g., from the memory device 908, or some other component of the apparatus 900) regarding a generated request for sensor information. The circuit/module for determining 920 may then make the determination based on the obtained information. For example, the circuit/module for determining 920 may select one or more of the attributes as discussed herein (e.g., in conjunction with FIGS. 5 and 6). The circuit/module for determining 920 may then output the attribute(s) to the circuit/module for sending 922, the memory device 908, or some other component.

The circuit/module for sending 922 may include circuitry and/or programming (e.g., code for sending 932 stored on the storage medium 904) adapted to perform several functions relating to, for example, sending (e.g., transmitting) information. In some implementations, the circuit/module for sending 922 may obtain information (e.g., from the circuit/module for determining 920, the memory device 908, or some other component of the apparatus 900), process the information (e.g., encode the information for transmission), and send the information to another component (e.g., the transmitter 914, the communication interface 902, or some other component) that will transmit the information to another device. In some scenarios (e.g., if the circuit/module for sending 922 includes a transmitter), the circuit/module for sending 922 transmits the information directly to another device (e.g., the ultimate destination) via radio frequency signaling or some other type of signaling suitable for the applicable communication medium.

The circuit/module for sending 922 (e.g., a means for sending) may take various forms. In some aspects, the circuit/module for sending 922 may correspond to, for example, an interface (e.g., a bus interface, a send/receive interface, or some other type of signal interface), a communication device, a transceiver, a transmitter, or some other similar component as discussed herein. In some implementations, the communication interface 902 includes the circuit/module for sending 922 and/or the code for sending 932. In some implementations, the circuit/module for sending 922 and/or the code for sending 932 is configured to control the communication interface 902 (e.g., a transceiver or a transmitter) to transmit information.

The circuit/module for receiving 924 may include circuitry and/or programming (e.g., code for receiving 934 stored on the storage medium 904) adapted to perform several functions relating to, for example, receiving information. In some scenarios, the circuit/module for receiving 924 may obtain information (e.g., from the communication interface 902, the memory device, or some other component of the apparatus 900) and process (e.g., decode) the information. In some scenarios (e.g., if the circuit/module for receiving 924 is or includes an RF receiver), the circuit/module for receiving 924 may receive information directly from a device that transmitted the information. In either case, the circuit/module for receiving 924 may output the obtained information to another component of the apparatus 900 (e.g., the circuit/module for identifying 926, the memory device 908, or some other component).

The circuit/module for receiving 924 (e.g., a means for receiving) may take various forms. In some aspects, the circuit/module for receiving 924 may correspond to, for example, an interface (e.g., a bus interface, a send/receive interface, or some other type of signal interface), a communication device, a transceiver, a receiver, or some other similar component as discussed herein. In some implementations, the communication interface 902 includes the circuit/module for receiving 924 and/or the code for receiving 934. In some implementations, the circuit/module for receiving 924 and/or the code for receiving 934 is configured to control the communication interface 902 (e.g., a transceiver or a receiver) to receive information.

The circuit/module for identifying 926 may include circuitry and/or programming (e.g., code for identifying 936 stored on the storage medium 904) adapted to perform several functions relating to, for example identifying an object. In some aspects, the circuit/module for identifying 926 (e.g., a means for identifying) may correspond to, for example, a processing circuit.

In some aspects, the circuit/module for identifying 926 may identify an object based on a received response. In this case, the circuit/module for identifying 926 may obtain response information (e.g., from the circuit/module for receiving 924, the memory device 908, or some other component). Next, the circuit/module for identifying 926 determines whether the response information indicates that there is an object in the vicinity of the apparatus 900. In some aspects, the circuit/module for identifying 926 may perform one or more of the operations described herein (e.g., in conjunction with FIGS. 1-8) to identify a nearby object (e.g., determine the location, size, motion, object type, or other information about the object). The circuit/module for identifying 926 may then output an indication of the identified object (e.g., to the communication interface 902, the memory device 908, or some other component).

First Example Process

Figure 10:
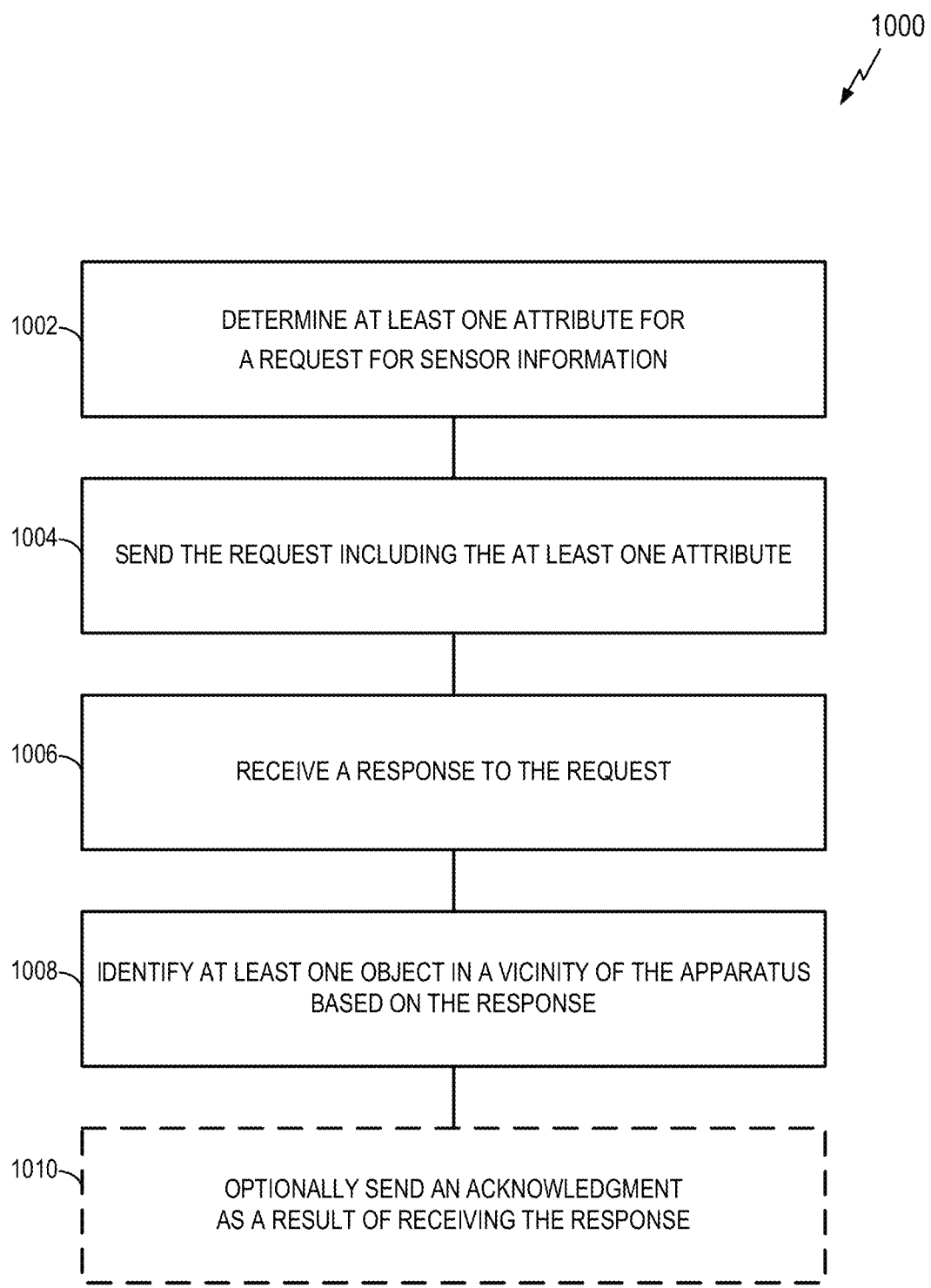
FIG. 10 is a flowchart illustrating an example of a process in accordance with some aspects of the disclosure.

FIG. 10 illustrates a process 1000 for communication in accordance with some aspects of the disclosure. The process 1000 may take place within a processing circuit (e.g., the processing circuit 910 of FIG. 9), which may be located in a vehicle, a component of a vehicle, a communication module, a sensor module, a sensor device, a peer-to-peer device, a UE, a CPE, a gNB, a transmit receive point (TRP), a base station (BS), an eNode B (eNB), or some other suitable apparatus. In some aspects, the process 1000 may be performed by the first apparatus 402 of FIG. 4. For example, blocks 1002, 1008, and 1010 may be performed by the object detection processor 408, and blocks 1004 and 1006 may be performed by the transceiver 410. Of course, in various aspects within the scope of the disclosure, the process 1000 may be implemented by any suitable apparatus capable of supporting communication-related operations.

At block 1002, an apparatus (e.g., a vehicle or an object detection device at a vehicle) determines (e.g., selects) at least one attribute for a request for sensor information.

The at least one attribute may take different forms in different scenarios. In some aspects, the at least one attribute may include a request for all sensor information. In some aspects, the at least one attribute may include a request for a subset of sensor information. In some aspects, the at least one attribute may include a location of the apparatus. In some aspects, the at least one attribute may include a request for a specific sensor feed. In some aspects, the at least one attribute may include a period of time for responding to the request. In some aspects, the at least one attribute may include an indication of a direction for sensing. In some aspects, the at least one attribute may include an indication of a distance to control which responders respond to the request. In some aspects, the at least one attribute may include an indication of a distance to control when to respond to the request. In some aspects, the at least one attribute may include any combination of the above.

In some implementations, the circuit/module for determining 920 of FIG. 9 performs the operations of block 1002. In some implementations, the code for determining 930 of FIG. 9 is executed to perform the operations of block 1002.

At block 1004, the apparatus sends the request including the at least one attribute. In implementations where the apparatus includes a transceiver, the request may be sent via the transceiver.

In some implementations, the circuit/module for sending 922 of FIG. 9 performs the operations of block 1004. In some implementations, the code for sending 932 of FIG. 9 is executed to perform the operations of block 1004.

At block 1006, the apparatus receives a response to the request. In implementations where the apparatus includes a transceiver, the response may be received via the transceiver.

In some implementations, the circuit/module for receiving 924 of FIG. 9 performs the operations of block 1006. In some implementations, the code for receiving 934 of FIG. 9 is executed to perform the operations of block 1006.

At block 1008, the apparatus identifies at least one object in a vicinity of the apparatus based on the response.

In some implementations, the circuit/module for identifying 926 of FIG. 9 performs the operations of block 1008. In some implementations, the code for identifying 936 of FIG. 9 is executed to perform the operations of block 1008.

At optional block 1010, the apparatus may send an acknowledgment as a result of receiving the response at block 1006.

In some implementations, the circuit/module for sending 922 of FIG. 9 performs the operations of block 1010. In some implementations, the code for sending 932 of FIG. 9 is executed to perform the operations of block 1010.

In some aspects, the process 1000 may further include receiving at least one other response to the request, wherein the identification of the at least one object is further based on the at least one other response; sending a first acknowledgment to a first responder that sent the response; and sending at least one second acknowledgment to at least one second responder that sent the at least one other response.

In some aspects, a process may include any combination of two or more of the operations of FIG. 10.

Second Example Apparatus

Figure 11:
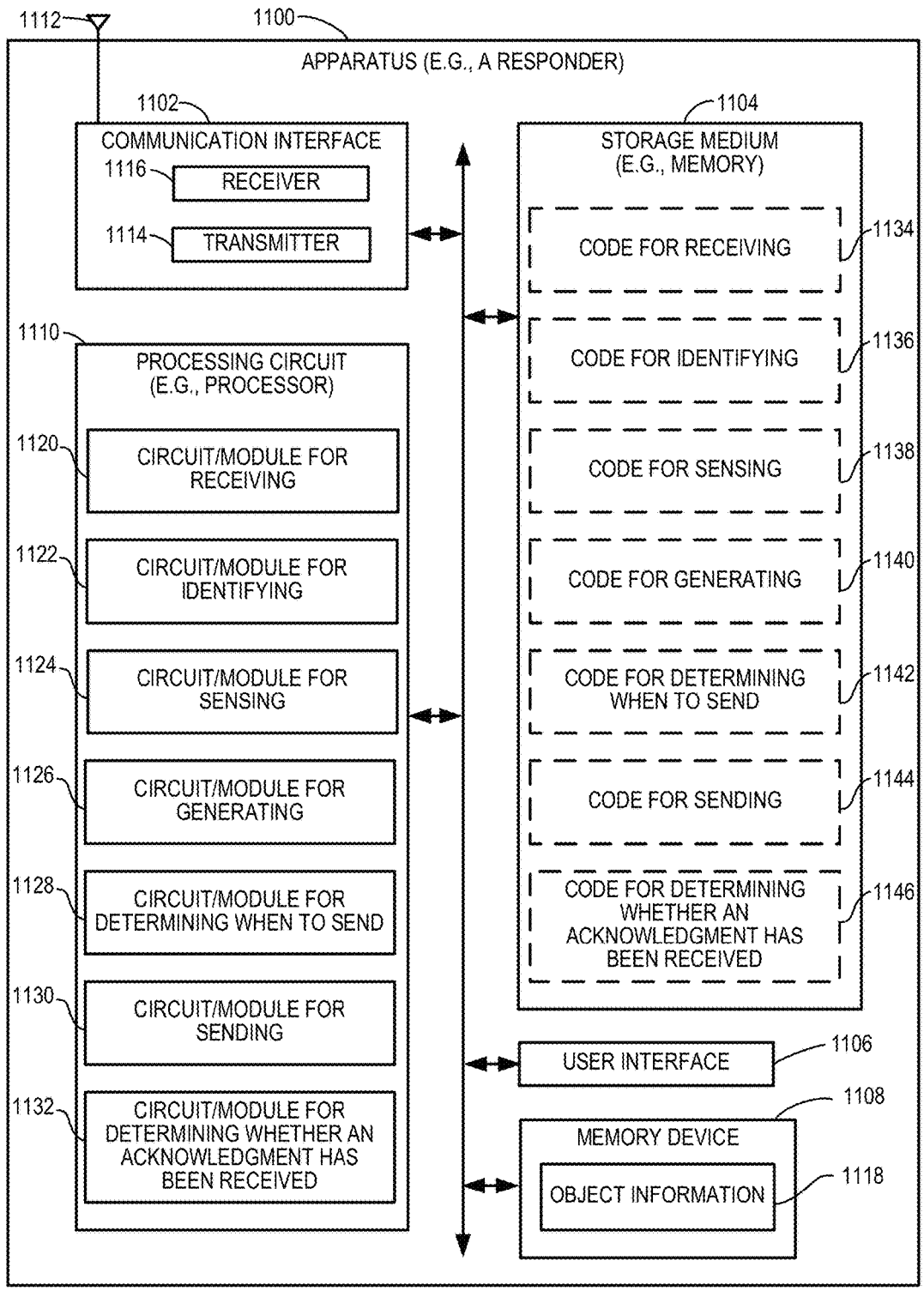
FIG. 11 is a block diagram illustrating an example hardware implementation for an apparatus (e.g., an electronic device) that can support communication in accordance with some aspects of the disclosure.

FIG. 11 illustrates a block diagram of an example hardware implementation of an apparatus 1100 configured to communicate according to one or more aspects of the disclosure. The apparatus 1100 could embody or be implemented within a vehicle, a component of a vehicle, a communication module, a sensor module, a sensor device, a peer-to-peer device, a UE, a CPE, a gNB, a transmit receive point (TRP), a base station (BS), an eNode B (eNB), or some other type of device that supports wireless communication. In various implementations, the apparatus 1100 could embody or be implemented within an access terminal, an access point, or some other type of device. In various implementations, the apparatus 1100 could embody or be implemented within a mobile phone, a smart phone, a tablet, a portable computer, a server, a personal computer, a network entity, a machine, a sensor, an entertainment device, a medical device, or any other electronic device having circuitry.

The apparatus 1100 includes a communication interface (e.g., at least one transceiver) 1102, a storage medium 1104, a user interface 1106, a memory device 1108 (e.g., storing object information 1118), and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 900 of FIG. 9.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-4, 6-8, 12, and 13. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application-specific integrated circuit (ASIC) that serves as a means for (e.g., structure for) carrying out any one of the operations described in conjunction with FIGS. 1-4, 6-8, 12, and 13. The processing circuit 1110 serves as one example of a means for transmitting and/or a means for receiving. In various implementations, the processing circuit 1110 may provide and/or incorporate the functionality of the second apparatus 404 of FIG. 4.

According to at least one example of the apparatus 1100, the processing circuit 1110 may include one or more of a circuit/module for receiving 1120, a circuit/module for identifying 1122, a circuit/module for sensing 1124, a circuit/module for generating 1126, a circuit/module for determining when to send 1128, a circuit/module for sending 1130, or a circuit/module for determining whether an acknowledgment has been received 1132. In various implementations, the circuit/module for receiving 1120, the circuit/module for identifying 1122, the circuit/module for sensing 1124, the circuit/module for generating 1126, the circuit/module for determining when to send 1128, the circuit/module for sending 1130, or the circuit/module for determining whether an acknowledgment has been received 1132 may provide and/or incorporate the functionality of the second apparatus 404 of FIG. 4, the apparatus 700 of FIG. 7, or the apparatus 800 of FIG. 8.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1-4, 6-8, 12, and 13 in various implementations. As shown in FIG. 11, the storage medium 1104 may include one or more of code for receiving 1134, code for identifying 1136, code for sensing 1138, code for generating 1140, code for determining when to send 1142, code for sending 1144, or code for determining whether an acknowledgment has been received 1146. In various implementations, the code for receiving 1134, the code for identifying 1136, the code for sensing 1138, the code for generating 1140, the code for determining when to send 1142, the code for sending 1144, or the code for determining whether an acknowledgment has been received 1146 may be executed or otherwise used to provide the functionality described herein for the circuit/module for receiving 1120, the circuit/module for identifying 1122, the circuit/module for sensing 1124, the circuit/module for generating 1126, the circuit/module for determining when to send 1128, the circuit/module for sending 1130, or the circuit/module for determining whether an acknowledgment has been received 1132.

The circuit/module for receiving 1120 may include circuitry and/or programming (e.g., code for receiving 1134 stored on the storage medium 1104) adapted to perform several functions relating to, for example, receiving information. In some scenarios, the circuit/module for receiving 1120 may obtain information (e.g., from the communication interface 1102, the memory device, or some other component of the apparatus 1100) and process (e.g., decode) the information. In some scenarios (e.g., if the circuit/module for receiving 1120 is or includes an RF receiver), the circuit/module for receiving 1120 may receive information directly from a device that transmitted the information. In either case, the circuit/module for receiving 1120 may output the obtained information to another component of the apparatus 1100 (e.g., the circuit/module for identifying 1122, the memory device 1108, or some other component).

The circuit/module for receiving 1120 (e.g., a means for receiving) may take various forms. In some aspects, the circuit/module for receiving 1120 may correspond to, for example, an interface (e.g., a bus interface, a send/receive interface, or some other type of signal interface), a communication device, a transceiver, a receiver, or some other similar component as discussed herein. In some implementations, the communication interface 1102 includes the circuit/module for receiving 1120 and/or the code for receiving 1134. In some implementations, the circuit/module for receiving 1120 and/or the code for receiving 1134 is configured to control the communication interface 1102 (e.g., a transceiver or a receiver) to receive information.

The circuit/module for identifying 1122 may include circuitry and/or programming (e.g., code for identifying 1136 stored on the storage medium 1104) adapted to perform several functions relating to, for example identifying an attribute. In some aspects, the circuit/module for identifying 1122 (e.g., a means for identifying) may correspond to, for example, a processing circuit.

In some aspects, the circuit/module for identifying 1122 may identify an attribute based on a received request. In this case, the circuit/module for identifying 1122 may obtain request information (e.g., from the circuit/module for receiving 1120, the memory device 1108, or some other component). Next, the circuit/module for identifying 1122 may extract one or more attributes from the request information. The circuit/module for identifying 1122 may then output the attributes (e.g., to the circuit/module for sensing 1124, the memory device 1108, or some other component).

The circuit/module for sensing 1124 may include circuitry and/or programming (e.g., code for sensing 1138 stored on the storage medium 1104) adapted to perform several functions relating to, for example, sensing for one or more objects. In some aspects, the circuit/module for sensing 1124 (e.g., a means for sensing) may correspond to, for example, a processing circuit.

In some aspects, the circuit/module for sensing 1124 may obtain information to control the sensing (e.g., from the circuit/module for identifying 1122, the memory device 1108, or some other component) and then invoke the sensing accordingly (e.g., sense in a particular direction, sense using a particular sensor, sense at a particular time, sense for particular objects, etc.) as discussed herein (e.g., in conjunction with FIGS. 1-11). The circuit/module for sensing 1124 may then output the result of the sensing (e.g., to the circuit/module for generating 1130, the circuit/module for determining when to send 1128, the memory device 1108, or some other component).

The circuit/module for generating 1126 may include circuitry and/or programming (e.g., code for generating 1140 stored on the storage medium 1104) adapted to perform several functions relating to, for example, generating a response. In some aspects, the circuit/module for generating 1126 (e.g., a means for generating) may correspond to, for example, a processing circuit.

In some aspects, the circuit/module for generating 1126 may obtain information to be included in a response (e.g., from the circuit/module for sensing 1124, the memory device 1108, or some other component) and then formulate a response (e.g., a response packet) that includes this information. The circuit/module for generating 1126 may then output the response (e.g., to the circuit/module for sending 1130, the circuit/module for determining when to send 1128, the memory device 1108, or some other component).

The circuit/module for determining when to send 1128 may include circuitry and/or programming (e.g., code for determining when to send 1142 stored on the storage medium 1104) adapted to perform several functions relating to, for example, determining when to send a response. In some aspects, the circuit/module for determining 1128 (e.g., a means for determining) may correspond to, for example, a processing circuit.

Initially, the circuit/module for determining when to send 1128 may obtain information upon which the determination is to be based. For example, the circuit/module for determining when to send 1128 may obtain information about a request and/or a requestor (e.g., from the memory device 1108, the circuit/module for receiving 1120, or some other component of the apparatus 1100) regarding a received request for sensor information. The circuit/module for determining when to send 1128 may then make the determination based on the obtained information. For example, the circuit/module for determining when to send 1128 may determine a time to send a response based on a distance of the apparatus 1100 from the requestor, whether sensor visibility of the apparatus 1100 is beyond a threshold distance, a random delay, or any combination thereof as discussed herein (e.g., in conjunction with FIGS. 1-9). The circuit/module for determining when to send 1128 may then output an indication of the time to send (e.g., to the circuit/module for sending 1130, the memory device 1108, or some other component).

The circuit/module for sending 1130 may include circuitry and/or programming (e.g., code for sending 1144 stored on the storage medium 1104) adapted to perform several functions relating to, for example, sending (e.g., transmitting) information. In some implementations, the circuit/module for sending 1130 may obtain information (e.g., from the circuit/module for determining 1128, the memory device 1108, or some other component of the apparatus 1100), process the information (e.g., encode the information for transmission), and send the information to another component (e.g., the transmitter 1114, the communication interface 1102, or some other component) that will transmit the information to another device. In some scenarios (e.g., if the circuit/module for sending 1130 includes a transmitter), the circuit/module for sending 1130 transmits the information directly to another device (e.g., the ultimate destination) via radio frequency signaling or some other type of signaling suitable for the applicable communication medium.

The circuit/module for sending 1130 (e.g., a means for sending) may take various forms. In some aspects, the circuit/module for sending 1130 may correspond to, for example, an interface (e.g., a bus interface, a send/receive interface, or some other type of signal interface), a communication device, a transceiver, a transmitter, or some other similar component as discussed herein. In some implementations, the communication interface 1102 includes the circuit/module for sending 1130 and/or the code for sending 1144. In some implementations, the circuit/module for sending 1130 and/or the code for sending 1144 is configured to control the communication interface 1102 (e.g., a transceiver or a transmitter) to transmit information.

The circuit/module for determining whether an acknowledgment has been received 1132 may include circuitry and/or programming (e.g., code for determining whether an acknowledgment has been received 1146 stored on the storage medium 1104) adapted to perform several functions relating to, for example, determining whether an acknowledgment of a response has been received a response. In some aspects, the circuit/module for determining 1132 (e.g., a means for determining) may correspond to, for example, a processing circuit.

Initially, the circuit/module for determining whether an acknowledgment has been received 1132 may obtain information upon which the determination is to be based. For example, the circuit/module for determining whether an acknowledgment has been received 1132 may obtain information (e.g., from the memory device 1108, the circuit/module for sending 1130, or some other component of the apparatus 1100) about a response that was sent by the apparatus 1100. The circuit/module for determining whether an acknowledgment has been received 1132 may then make the determination based on the obtained information. For example, the circuit/module for determining whether an acknowledgment has been received 1132 may determine whether an acknowledgement having a certain identifier associated with the response has been received. The circuit/module for determining whether an acknowledgment has been received 1132 may then output an indication of the determination (e.g., to the circuit/module for sending 1130, the memory device 1108, or some other component).

Second Example Process

Figure 12:
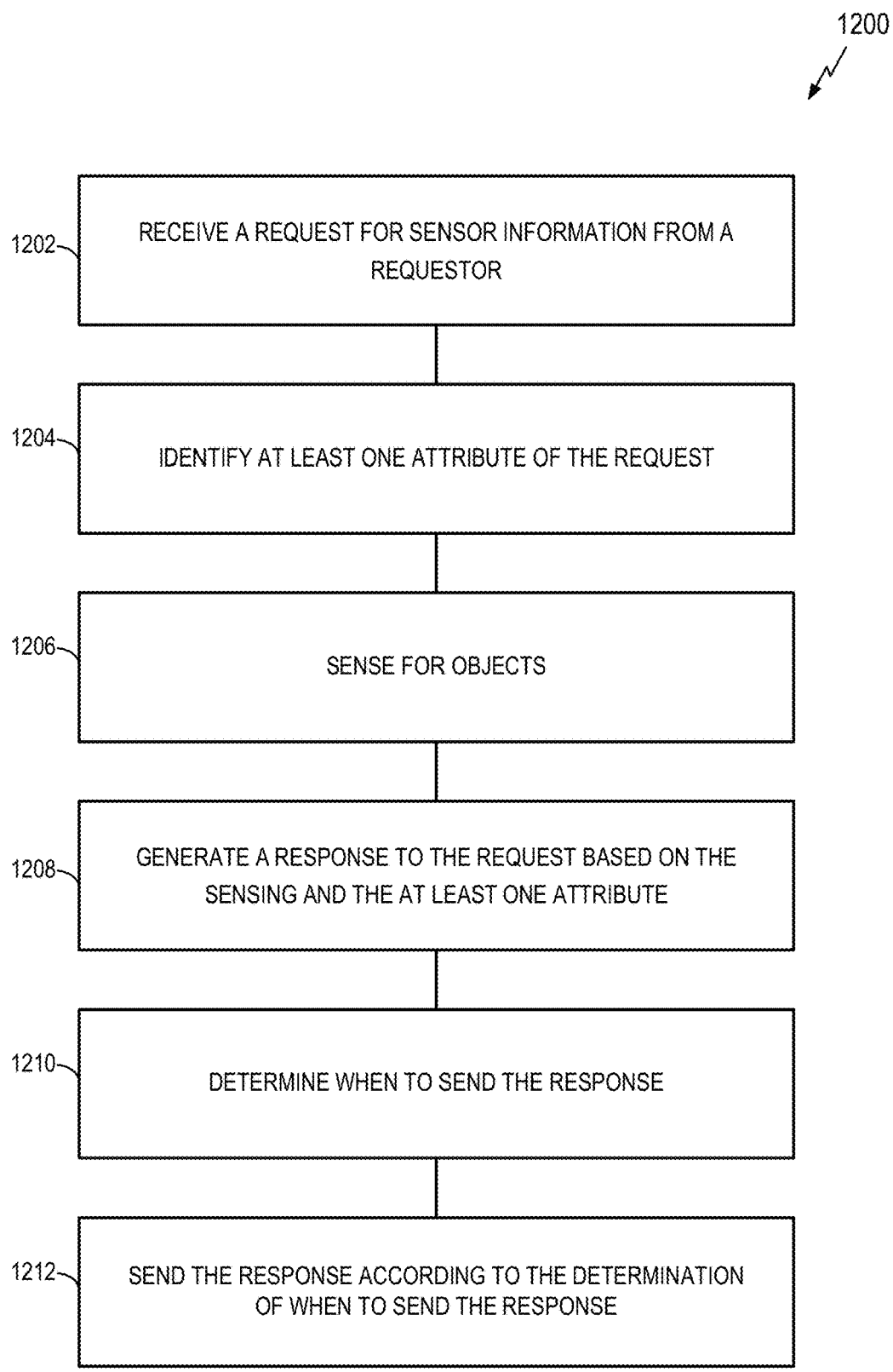
FIG. 12 is a flowchart illustrating an example of a process in accordance with some aspects of the disclosure.

FIG. 12 illustrates a process 1200 for communication in accordance with some aspects of the disclosure. In some aspects, the process 1200 may complementary to the process 1000 of FIG. 10. For example, the process 1200 may be performed in response to the process 1000. The process 1200 may take place within a processing circuit (e.g., the processing circuit 1110 of FIG. 11), which may be located in a vehicle, a component of a vehicle, a communication module, a sensor module, a sensor device, a peer-to-peer device, a UE, a CPE, a gNB, a transmit receive point (TRP), a base station (BS), an eNode B (eNB), or some other suitable apparatus. In some aspects, the process 1200 may be performed by the second apparatus 404 of FIG. 4. For example, block 1206 may be performed by the at least one sensor 412, blocks 1204, 1208, and 1210 may be performed by the object detection processor 414, and blocks 1202 and 1212 may be performed by the transceiver 416. Of course, in various aspects within the scope of the disclosure, the process 1200 may be implemented by any suitable apparatus capable of supporting communication-related operations.

At block 1202, an apparatus (e.g., an object detection device at a vehicle) receives a request for sensor information from a requestor. In implementations where the apparatus includes a transceiver, the request may be received via the transceiver.

In some implementations, the circuit/module for receiving 1120 of FIG. 11 performs the operations of block 1202. In some implementations, the code for receiving 1134 of FIG. 11 is executed to perform the operations of block 1202.

At block 1204, the apparatus identifies at least one attribute of the request. The at least one attribute may take different forms in different scenarios. In some aspects, the at least one attribute may include a request for all sensor information. In some aspects, the at least one attribute may include a request for a subset of sensor information. For example, the at least one attribute may indicate that the sensing is to be directed to a blind spot of the requestor, a designated area, a certain range of (distance from) the requestor, a certain direction, or any combination thereof. In some aspects, the at least one attribute may include a request for a specific sensor feed (e.g., Lidar data, camera data, radar data, object data, etc.). In some aspects, the at least one attribute may indicate a period of time for responding to the request. In some aspects, the at least one attribute may include any combination of the above.

In some implementations, the circuit/module for identifying 1122 of FIG. 11 performs the operations of block 1204. In some implementations, the code for identifying 1136 of FIG. 11 is executed to perform the operations of block 1204.

At block 1206, the apparatus senses for objects. For example, the apparatus may sense for objects before and/or after receiving the request. In the latter case, the sensing may be based on (e.g., in response to) the request.

In some aspects, the at least one attribute may include a direction of sensing as indicated in the request (e.g., a direction relative to the requestor or the apparatus). In this case, the sensing may be based on the direction (e.g., the apparatus senses for objects in the indicated direction).

In some implementations, the circuit/module for sensing 1124 of FIG. 11 performs the operations of block 1206. In some implementations, the code for sensing 1138 of FIG. 11 is executed to perform the operations of block 1206.

At block 1208, the apparatus generates a response to the request based on the sensing and the at least one attribute. For example, the apparatus may determine whether and/or how to generate the request based on one or more request attributes. In some aspects, the generation of the response may include determining that at least one object has been reported in another response to the request, and abstaining from reporting the at least one object (i.e., that has already been reported).

In some aspects, the at least one attribute may include a location of the requestor as indicated in the request. In this case, the generation of the response may be based on the location. For example, the response might only include objects that are within a specified range of the requestor's location.

In some implementations, the circuit/module for generating 1126 of FIG. 11 performs the operations of block 1208. In some implementations, the code for generating 1140 of FIG. 11 is executed to perform the operations of block 1208.

At block 1210, the apparatus determines when to send the response. In some aspects, the determination of when to send the response may be based on: a distance of the apparatus from the requestor, whether sensor visibility of the apparatus is beyond a threshold distance, a random delay, or any combination thereof.

In some implementations, the circuit/module for determining when to send 1128 of FIG. 11 performs the operations of block 1210. In some implementations, the code for determining when to send 1142 of FIG. 11 is executed to perform the operations of block 1210.

At block 1212, the apparatus sends the response according to the determination of block 1210 (e.g., at a time determined at block 1210). In implementations where the apparatus includes a transceiver, the response may be sent via the transceiver.

In some implementations, the circuit/module for sending 1130 of FIG. 11 performs the operations of block 1212. In some implementations, the code for sending 1144 of FIG. 11 is executed to perform the operations of block 1212.

In some aspects, the process 1200 may further include determining whether an acknowledgment of the response has been received; and re-sending the response if the acknowledgment has not been received.

In some aspects, a process may include any combination of two or more of the operations of FIG. 12.

Third Example Process

Figure 13:
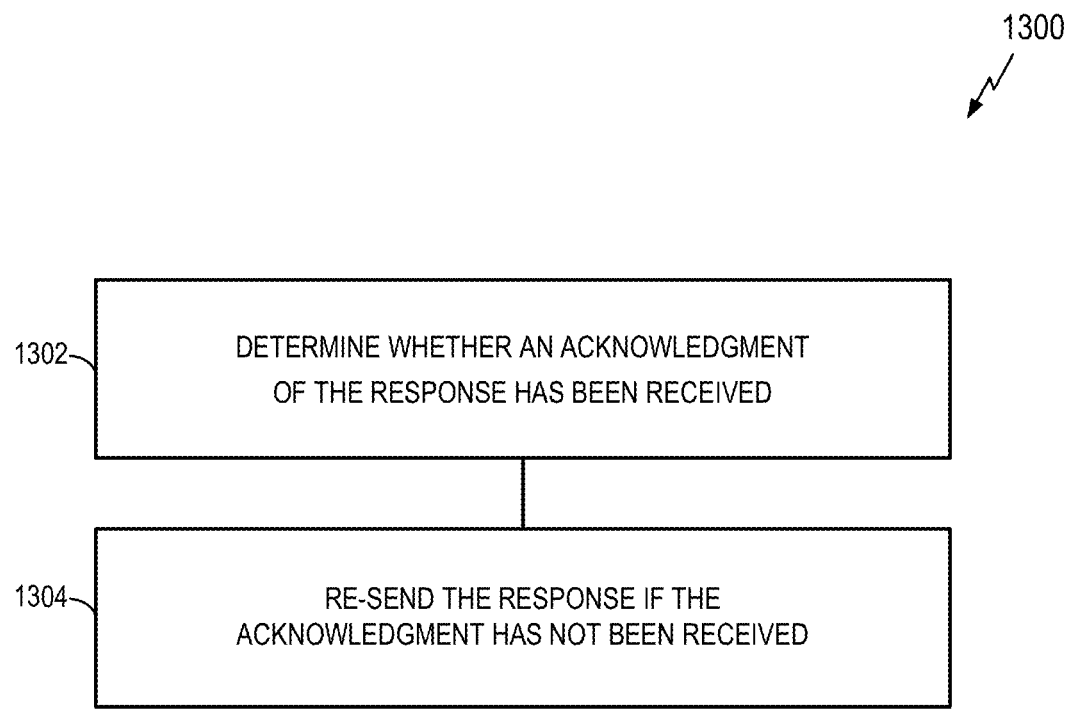
FIG. 13 is a flowchart illustrating an example of a process in accordance with some aspects of the disclosure.

FIG. 13 illustrates a process 1300 for communication in accordance with some aspects of the disclosure. In some aspects, the process 1300 may be performed in conjunction with (e.g., in addition to or as part of) the process 1200 of FIG. 12. For example, the process 1300 may be performed after block 1212 of FIG. 12. The process 1300 may take place within a processing circuit (e.g., the processing circuit 1110 of FIG. 11), which may be located in a vehicle, a component of a vehicle, a communication module, a sensor device, a peer-to-peer device, a UE, a CPE, a gNB, a transmit receive point (TRP), a base station (BS), an eNode B (eNB), or some other suitable apparatus. In some aspects, the process 1300 may be performed by the second apparatus 404 of FIG. 4 (e.g., by the object detection processor 414). Of course, in various aspects within the scope of the disclosure, the process 1300 may be implemented by any suitable apparatus capable of supporting communication-related operations.

At block 1302, an apparatus (e.g., an object detection device at a vehicle) determines whether an acknowledgment of the response has been received.

In some implementations, the circuit/module for determining when to send 1128 of FIG. 11 performs the operations of block 1302. In some implementations, the code for determining when to send 1142 of FIG. 11 is executed to perform the operations of block 1302.

At block 1304, the apparatus re-sends the response if the acknowledgment has not been received. In implementations where the apparatus includes a transceiver, the response may be re-sent via the transceiver.

In some implementations, the circuit/module for sending 1130 of FIG. 11 performs the operations of block 1304. In some implementations, the code for sending 1144 of FIG. 11 is executed to perform the operations of block 1304.

In some aspects, a process may include any combination of two or more of the operations of FIG. 13.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term receiving may include obtaining (e.g., an integrated circuit chip may obtain information via an interface), receiving an RF signal (e.g., a transceiver or receiver may receive an RF signal via an antenna), or other forms of receiving. In addition, as used herein, the term sending may include outputting or providing (e.g., an integrated circuit chip may output information via an interface), transmitting an RF signal (e.g., a transceiver or transmitter may transmit an RF signal via an antenna), or other forms of sending.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication by an apparatus, comprising:
    determining at least one attribute to be included in a request for sensor information;
    generating the request, wherein the request includes the at least one attribute, and wherein the at least one attribute specifies that an object that has already been reported is not to be reported;
    sending the request;
    receiving a first response to the request;
    receiving at least one other response to the request;
    identifying at least one object in a vicinity of the apparatus based on the first response and the at least one other response;
    controlling at least one operation of the apparatus based on the identification of the at least one object;
    sending a first acknowledgment to a first responder that sent the first response; and
    sending at least one second acknowledgment to at least one second responder that sent the at least one other response.

2. The method of claim 1, wherein the at least one attribute comprises a request for all sensor information, a request for a subset of sensor information, a location of the apparatus, a period of time for responding to the request, or any combination thereof.

3. The method of claim 1, wherein the at least one attribute comprises a request for a specific sensor feed.

4. The method of claim 1, wherein the at least one attribute comprises an indication of a direction for sensing.

5. The method of claim 1, wherein the at least one attribute comprises an indication of a distance to control which responders respond to the request.

6. The method of claim 1, wherein the at least one attribute comprises an indication of a distance to control when to respond to the request.

7. The method of claim 1, wherein the apparatus is a vehicle.

8. An apparatus for communication, comprising:
    a memory device; and
    a processing circuit coupled to the memory device, wherein the processing circuit is configured to:
        determine at least one attribute to be included in a request for sensor information,
        generate the request, wherein the request includes the at least one attribute, and wherein the at least one attribute specifies that an object that has already been reported is not to be reported,
        send the request including the at least one attribute,
        receive a first response to the request,
        receive at least one other response to the request;
        identify at least one object in a vicinity of the apparatus based on the first response and the at least one other response,
        control at least one operation of the apparatus based on the identification of the at least one object,
        send a first acknowledgment to a first responder that sent the first response; and
        send at least one second acknowledgment to at least one second responder that sent the at least one other response.

9. The apparatus of claim 8, wherein:
    the apparatus is a vehicle;
    the apparatus further comprises a transceiver;
    the processing circuit is further configured to send the request via the transceiver; and
    the processing circuit is further configured to receive the response via the transceiver.

10. The apparatus of claim 8, wherein the apparatus is a communication module or a sensor module.

11. The apparatus of claim 8, wherein the at least one attribute comprises at least one of: a request for all sensor information, a request for a subset of sensor information, a location of the apparatus, a request for a specific sensor feed, a period of time for responding to the request, an indication of a direction for sensing, an indication of a distance to control which responders respond to the request, an indication of a distance to control when to respond to the request, or any combination thereof.

12. A method of communication by an apparatus, comprising:
   receiving a request for sensor information from a requestor;
   identifying at least one attribute of the request, wherein the at least one attribute includes a location of the requestor and a window of time that were indicated in the request;
   sensing for objects via at least one sensor;
   monitoring for at least one response to the request;
   generating a response to the request based on the sensing and the at least one attribute including the location, wherein the generation of the response comprises: determining that at least one object has been reported by the at least one response for the window of time, and abstaining from reporting the at least one object as a result of the determination that the at least one object has been reported;
   determining when to send the response; and
   sending the response according to the determination of when to send the response.

13. The method of claim 12, wherein the determination of when to send the response is based on: a distance of the apparatus from the requestor, whether sensor visibility of the apparatus is beyond a threshold distance, a random delay, or any combination thereof.

14. The method of claim 12, wherein:
   the at least one attribute comprises a direction of sensing as indicated in the request; and
   the sensing is based on the direction.

15. The method of claim 12, wherein the at least one attribute comprises a request for all sensor information.

16. The method of claim 12, wherein the at least one attribute comprises a request for a subset of sensor information.

17. The method of claim 12, wherein the at least one attribute comprises a request for a specific sensor feed.

18. The method of claim 12, wherein the at least one attribute comprises a period of time for responding to the request.

19. The method of claim 12, wherein the apparatus is a vehicle.

20. An apparatus for communication, comprising:
   a memory device; and
   a processing circuit coupled to the memory device, wherein the processing circuit is configured to:
      receive a request for sensor information from a requestor,
      identify at least one attribute of the request, wherein the at least one attribute includes a location of the requestor and a window of time that were indicated in the request,
      sense for objects via at least one sensor,
      monitor for at least one response to the request,
      generate a response to the request based on the sensing and the at least one attribute including the location, wherein the generation of the response comprises: determining that at least one object has been reported by the at least one response for the window of time, and abstaining from reporting the at least one object as a result of the determination that the at least one object has been reported,
      determine when to send the response, and send the response according to the determination of when to send the response.

21. The apparatus of claim 20, wherein the determination of when to send the response is based on a distance of the apparatus from the requestor.

22. The apparatus of claim 20, wherein the determination of when to send the response is based on whether sensor visibility of the apparatus is beyond a threshold distance.

23. The apparatus of claim 20, wherein the determination of when to send the response is based on a random delay.

24. The apparatus of claim 20, wherein the at least one attribute comprises at least one of: a request for all sensor information, a request for a subset of sensor information, a request for a specific sensor feed, a period of time for responding to the request, or any combination thereof.

25. The apparatus of claim 20, wherein:
   the apparatus is a vehicle;
   the apparatus further comprises a transceiver;
   the processing circuit is further configured to receive the request via the transceiver; and
   the processing circuit is further configured to send the response via the transceiver.

26. The apparatus of claim 20, wherein the apparatus is a communication module or a sensor module.

* * * * *